US008487856B2

(12) United States Patent
Joly et al.

(10) Patent No.: US 8,487,856 B2
(45) Date of Patent: Jul. 16, 2013

(54) ADDRESSING METHOD FOR A BISTABLE NEMATIC LIQUID CRYSTAL MATRIX SCREEN WITH REGULATED AVERAGE QUADRATIC VOLTAGE

(75) Inventors: Stéphane Joly, Saint Saturnin (FR); Christophe Body, Bailleau Armenonville (FR); Jean-Denis Laffitte, Leuville sur Orge (FR)

(73) Assignee: NEMOPTIC, Magny-les-Hameaux (FR)

( * ) Notice: Subject to any disclaimer, the term of this patent is extended or adjusted under 35 U.S.C. 154(b) by 787 days.

(21) Appl. No.: 12/296,024

(22) PCT Filed: Mar. 20, 2007

(86) PCT No.: PCT/FR2007/050965

§ 371 (c)(1),
(2), (4) Date: Mar. 25, 2009

(87) PCT Pub. No.: WO2007/116162

PCT Pub. Date: Oct. 18, 2007

(65) Prior Publication Data

US 2009/0273549 A1 Nov. 5, 2009

(30) Foreign Application Priority Data

Apr. 7, 2006 (FR) ..................................... 06 51275

(51) Int. Cl.
*G09G 3/36* (2006.01)
*G02F 1/133* (2006.01)
*C09K 19/02* (2006.01)

(52) U.S. Cl.
USPC ................................ 345/94; 349/33; 349/178

(58) Field of Classification Search
USPC ..................................... 345/100, 87; 349/113
See application file for complete search history.

(56) References Cited

U.S. PATENT DOCUMENTS

| | | | | |
|---|---|---|---|---|
| 6,327,017 | B2 | 12/2001 | Barberi et al. | |
| 6,452,573 | B1 | 9/2002 | Martinot-Lagarde et al. | |
| 7,173,587 | B2 | 2/2007 | Angele et al. | |
| 7,224,417 | B2 | 5/2007 | Angele et al. | |
| 7,352,346 | B2 | 4/2008 | Angele et al. | |
| 2001/0024188 | A1* | 9/2001 | Masazumi et al. | 345/100 |
| 2003/0052844 | A1* | 3/2003 | Fish et al. | 345/87 |
| 2003/0174266 | A1* | 9/2003 | Dozov et al. | 349/113 |
| 2005/0073491 | A1* | 4/2005 | Mi | 345/89 |
| 2005/0253875 | A1* | 11/2005 | Johnson | 345/690 |
| 2006/0262248 | A1* | 11/2006 | Burberry et al. | 349/86 |
| 2000/0070001 | | 3/2007 | Martinot-Lagarde et al. | |

OTHER PUBLICATIONS

C. Joubert et al., "Ultra Low Power Bright Reflective Displays using Bineme® Technology Fabricated by Standard Manufacturing Equipment", SID 02 Digest, 2002, p. 1-4.
M. Giocondo et al., "Write and Erase Mechanism of Surface Controlled Bistable Nematic Pixel", Eur. Phys. J. AP 5, 227 1999, p. 1-8.

(Continued)

*Primary Examiner* — Bipin Shalwala
*Assistant Examiner* — Ryan A Lubit
(74) *Attorney, Agent, or Firm* — Greer, Burns & Crain, Ltd.

(57) ABSTRACT

A method for addressing a bistable nematic matrix LCD having two stable textures without any applied electric field. Pixel addressing is of the passive multiplex type. The method includes selecting the value of the electrical voltage applied between the substrates so that an average value of the voltage, preferably the average quadratic value, since the initial command for image display up to the time immediately preceding switching, has a predetermined value independent of the information to be displayed, which is the same for all the pixels of the image.

19 Claims, 24 Drawing Sheets

OTHER PUBLICATIONS

I. Dozov et al., "First-order Breaking Transition of Tilted Nematic Anchoring", Phys. Rev. E., vol. 58, No. 6, Dec. 1998, p. 7442-7446.

I. Dozov et al., A New Approach to Gray Scale in BiNem® LCDs, Proceeding IDW '04, 2004, p. 1711-1714.

Liquid Crystal Displays, addressing schemes and electrooptical effects, Ernst Lueder, John Wiley and Sons, Ed 2001, Chapter 12, p. 167-169.

* cited by examiner

PRIOR ART

PRIOR ART

PRIOR ART

PRIOR ART

PRIOR ART

PRIOR ART

PRIOR ART

| | | |
|---|---|---|
| L5<br>L4<br>L3<br>L2<br>L1 |  | $Vc_{1\text{-}4}$= Vc1=Vc2=Vc3=Vc4= -2V<br>Vc5 = 4V<br>Vrms(5) = 1.55 V |
| L5<br>L4<br>L3<br>L2<br>L1 |  | $Vc_{1\text{-}4}$= Vc1=Vc2=Vc3=Vc4= -3V<br>Vc5 = 4V<br>Vrms(5) = 2.32 V |
| L5<br>L4<br>L3<br>L2<br>L1 |  | $Vc_{1\text{-}4}$= Vc1=Vc2=Vc3=Vc4= -4V<br>Vc5 = 4V<br>Vrms(5) = 3.10 V |

Figure 18
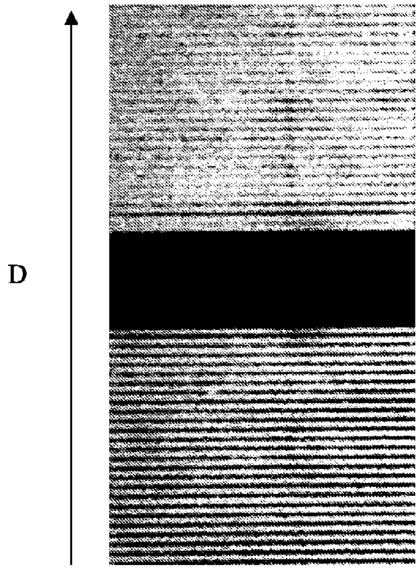
Figure 18a
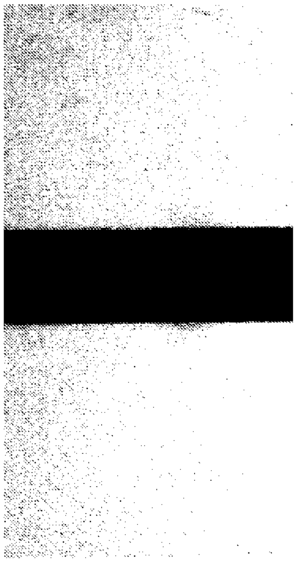
Figure 18b

Figure $18_1$
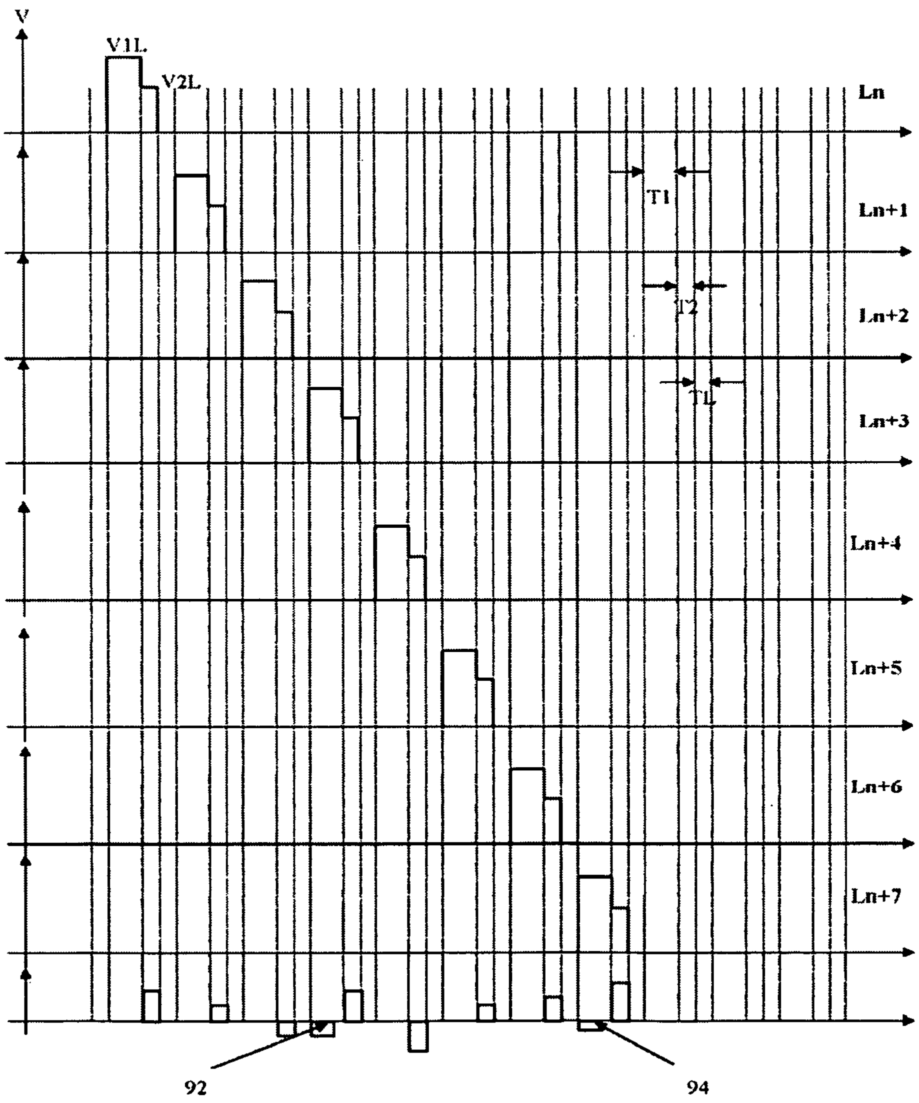

Figure $18_2$ :
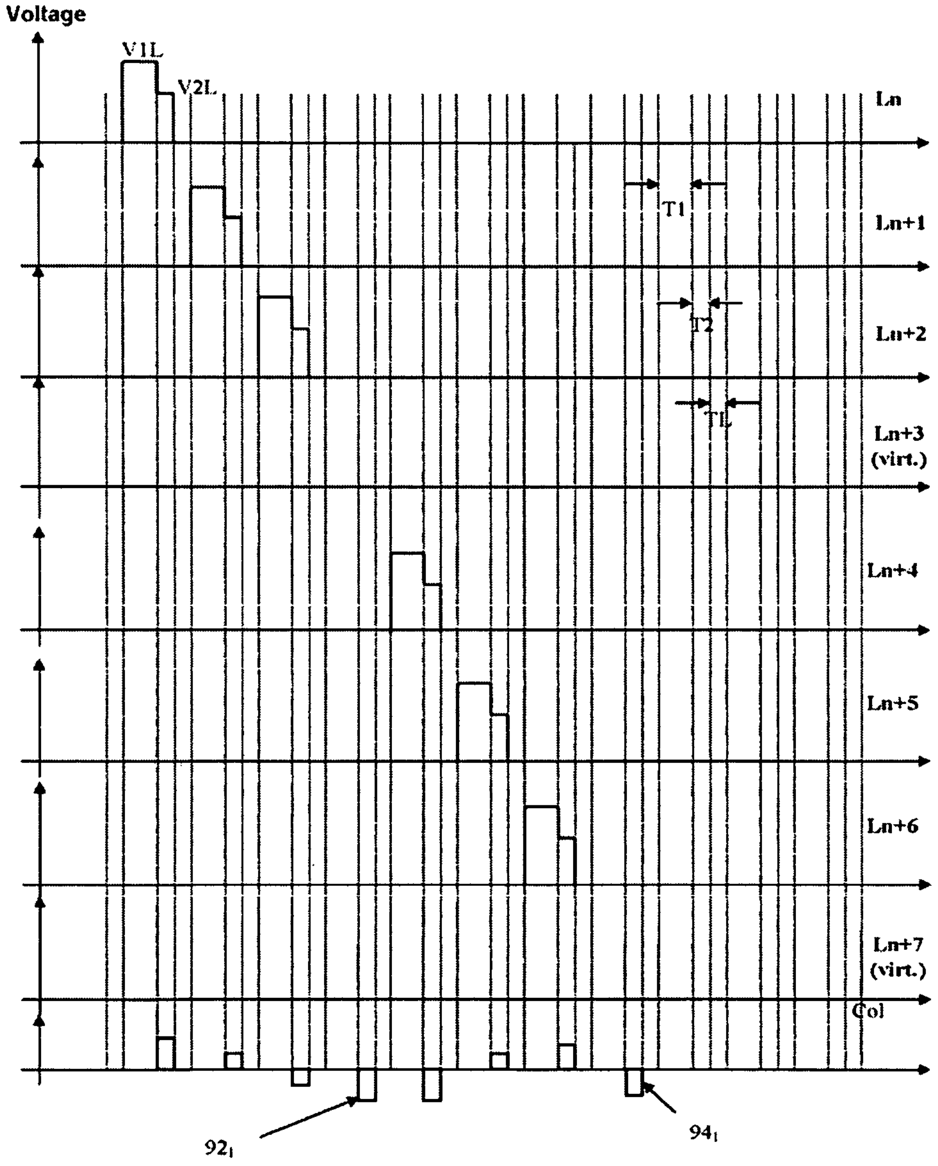

Nc

ADDRESSING METHOD FOR A BISTABLE NEMATIC LIQUID CRYSTAL MATRIX SCREEN WITH REGULATED AVERAGE QUADRATIC VOLTAGE

FIELD OF THE INVENTION

The present invention relates to the field of liquid crystal displays.

More specifically, the present invention relates to bistable nematic liquid crystal displays. The present invention particularly applies to bistable nematic liquid crystal displays, with anchoring breaking having two stable textures differing by a twist of approximately 180°.

OBJECTIVE OF THE INVENTION

The first objective of the present invention is to improve the performances of bistable display devices.

A second objective is to provide an addressing principle of bistable display devices enabling the obtaining of controlled and uniform gray levels throughout the full display device.

These two results are obtained by the use of addressing signals which make it possible to make uniform the changeover thresholds from one texture to the other throughout the full display device.

PRIOR ART

Bistable Nematic Liquid Crystal Devices

Several bistable nematic liquid crystal devices have already been proposed.

One of them, to which the present invention particularly applies, is known under the name of "BiNem". These "BiNem" displays are bistable nematic liquid crystal displays with anchoring breaking having two stable textures differing by a twist of 180°. They are described in documents [1] and [2].

A BiNem display, according to this method, is composed of a layer of chiralised nematic liquid crystal positioned between two substrates formed by two glass blades, one "master" blade 30, the other "slave" blade 32. Line electrode 34 and column electrode 36, placed respectively on each of the substrates, receive electric control signals and enable the application on the nematic liquid crystal of an electric field perpendicular to the surfaces. Anchoring layers 38 and 40 are positioned on the electrodes. On the master blade, the anchoring 38 of the liquid crystal molecules is strong and slightly tilted, on the slave blade, the anchoring 40 is weak and flat or very slightly tilted.

Two bistable textures can be obtained. They differ by a twist of ±180° and are topologically incompatible. A uniform or slightly twisted texture is named U and a twisted texture is named T. The spontaneous pitch of the nematic is chosen substantially equal to the quarter of the cell's thickness, to make the energies of U and T essentially equal. Without field, there is no other state with a lower energy: U and T present a real bistability.

Optically, the two states U and T are very different and make it possible to display images in black and white with a contrast greater than 100.

Under high electric field E an almost homeotropic texture named H is obtained. On the slave surface 40, the molecules are normal to the plate in the vicinity of its surface, the anchoring is said "broken": at the interruption of the electric field, the cell evolves towards either stable state U or T (see FIG. 1). When the command signals used induce a high flow of the liquid crystal in the vicinity of master blade 30, the hydrodynamic coupling 42 between the master blade and the slave blade induces the texture T. In the contrary case, the texture U is obtained by elastic coupling 44, assisted by the possible tilting of the weak anchoring. Hereafter, "switchover" of a BiNem screen item will designate the liquid crystal molecules passing through the homeotrope (anchoring breaking), then evolving towards one of the two stable states U or T when the electric field is interrupted.

The hydrodynamic coupling [6] between slave blade and master blade is linked to the viscosity of the liquid crystal. Upon interruption of the field, the return to equilibrium of the molecules anchored on the master blade create a flow nearby it. The flow propagates in the full thickness of the cell within less than a microsecond.

If the hydrodynamic flow 46 is strong enough, near to slave blade 32, it tilts there the molecules in the direction which induces the texture T; they turn in an opposite direction on the two blades. The return to equilibrium of the molecules near to the slave blade is a second driving force for the flow, it reinforces it and assists for the uniform changeover of the pixel to texture T. Thus the changeover of the texture H under field to texture T is obtained by means of a flow, therefore a displacement of the liquid crystal in the direction in which the anchoring of the molecules on the master blade is tilted (see FIG. 2).

The elastic coupling between the two blades produces a very slight tilting of the molecules near the slave blade, in the texture H under field; even if the field applied tends to direct them perpendicularly to the blades. Indeed, the strong tilted anchoring of the master blade maintains the adjacent molecules tilted. The tilting near to the master blade is transmitted by the directional elasticity of the liquid crystal until the slave blade; on the slave blade, the strength of the anchoring and its possible tilting amplifies the tilting of the molecules. [7]. With regards to the interruption of the field, the hydrodynamic coupling is not sufficient to fight against the residual tilting of the molecules near to the slave blade, the molecules near to both blades return to equilibrium by turning in the same direction: the texture U is obtained. These two rotations are simultaneous, they induce flows running in the opposite direction which act against each other. The total flow rate is almost non-existent. Therefore, there is no global displacement of the liquid crystal during the changeover from the texture H to the texture U.

BiNem displays are most often matrix screens made up of N×M pixels, created at the intersection of perpendicular conductive strips placed on the master and slave substrates. An example of a 4-line 50 and 4 column 52 display created according to prior art is provided in FIG. 3. On the line electrodes, the said 'excitation' signals are sequentially applied, enabling the switchover of all the line's pixels. The first part of the line excitation signal enables the breaking of the anchoring throughout the full line. During the second part of the line excitation signal, for each of the line's pixels, a signal is applied to its column. This signal enables the selection of the final texture of this pixel, independently from the line's other pixels. All the column signals are applied simultaneously to all the line's pixels. The display is said 'addressed' when all lines have been successively excited. Thus, the application of multiplexing signals enables, by the combination of line and column signals, selection of the final state of the N×M pixels of the matrix forming the display: the switchover voltage applied to the pixel during the excitation time of the line forms a pulse which, in a first phase (V1L, T1), breaks the anchoring, then in a second phase (V2L, T2), determines the final texture of the pixel (see FIG. 4). Typically, on request, during this second phase, the applied voltage will either suddenly stop, provoking a sufficient voltage drop to induce the twisted texture T, or progressively lower, possibly in levels, creating the uniform texture U. The amplitude of the pixel voltage determining the speed of the voltage drop is generally low. It is created by multiplexing said 'column' signals and contains the image information. It is therefore the column voltage that enables, once the anchoring is "broken", selection of the pixel's final texture. The amplitude of the pixel voltages enabling the anchoring breaking is higher. It is created by multiplexing said 'line' signals and is independent from the image's contents. Hereafter, the display's electrodes enabling the application of "line" signals will be called lines, and the electrodes enabling the application of "column" voltages will be called columns. The application of the multiplexing signals enables the selection of the texture of all a line's pixels, by successively sweeping each line of the screen and by simultaneously applying the column signals determining the state of each of the excited line's pixels. An example of multiplexing signals according to prior art is provided in FIG. 5.

In this figure, Ln corresponds to the line n, $C_m$ corresponds to the column m, $C_{m+1}$ corresponds to the column m+1 and P(n, m) corresponds to the pixel n, m and $P_{n,m+1}$ corresponds to the pixel P(n,m+1). On each line, signals of voltages V1L and V2L are applied with a duration of T1 and T2 respectively whilst on column m, voltages VC with a Tc duration are applied. The column signals are positive and negative alternately.

According to a preferential embodiment, the lines of the multiplex BiNem display are directed perpendicularly to the direction of the hydrodynamic flow.

When the switchover is carried out on pixels of small dimensions, (typically in the case of a BiNem display, pixels have several hundreds of side micrometers) an inhibition is apparent in the selection of the texture T at the pixel edges depending on the flow direction of the liquid crystal. This phenomenon is interpreted as a slowing down of the liquid crystal flow at the limits of the pixel during the switchover in T.[9].

In the case of an addressing in multiplexed mode on a bistable display of BiNem type, a texture U can be observed on the pixel's edges in the direction D2 of the brushing (FIG. 3).

This phenomenon can be judiciously used to create a bistable display of BiNem type with gray levels. Indeed, if the pixels function independently, the electric signal can be adjusted to make a part of the pixel switchover in T and thus obtain shades of grey by progressive variation of the pixel's switched-over surface (see FIGS. 6 and 7).

FIG. 6 comprises four parts, 6*a*, 6*b*, 6*c* and 6*d*. On FIG. 6*a*, a white square 60 has been shown wherein the pixel's texture is T. The parts in black on FIGS. 6*b*, 6*c* and 6*d* (square 62, 64 and 66) correspond to the texture U.

FIG. 6*b* corresponds to a level of pale gray, for which the texture T in white is predominant;

FIG. 6*c* corresponds to a level of dark gray for which the texture U is predominant and;

FIG. 6*d* corresponds to black (texture U).

FIG. 7 shows the optical state of pixels for a 160×480 display according to prior art with relation to the addressed column voltage Vc. In this FIG. 7, the passing through texture T is pale and the texture U does not pass through and is dark. The double arrow D1 represents the direction of line electrodes.

By using an optimal configuration of the brushing direction of the slave blade with regard to the direction of the line electrodes, two distinct domains are obtained inside one same pixel: a domain T and a domain U, separated by a single border, generally rectilinear. The high size of the domains produces an optimal stability. The inspection of the position of this border in the pixel thus determines a set of gray levels. The means implemented for this purpose are described in documents [9] and [10].

They include the application of command signals adapted to control the speed of the liquid crystal's displacement and thus to progressively control the scope of one of the two stable states inside each of the pixels, in order to obtain controlled gray levels inside each of these.

The aforementioned command signals can proceed by modulation of different parameters, and notably the level of voltage of the column signals and/or their duration, as shown in FIG. 8.

Thus FIG. 8*a* shows the signals for a line $L_n$, FIG. 8*b* shows the signals for the line $L_{n+1}$, FIG. 8*c* shows the column signals Cm with a modulation of the amplitude Vc of the column signal, FIG. 8*d* shows the column signal Cm with a modulation of duration Tc of this column signal and FIG. 8*d* shows the modulation of the phase ΔTc of the column signal Cm.

In the case of a display with gray level, it is important that the final optical state of each pixel, defined by the ratio between the surface occupied by the texture t and the total surface of the pixel, can be precisely controlled for each of the screen's pixels. Otherwise, the uniformity of an image's display for a given gray level would fail to come up to expectations (i.e. the number of effectively available different gray levels would be reduced). For example, to create 8 different gray levels on one pixel, it is important to be able to control the position of the border between the zones u and t with a minimum precision of 100/8=12.5% of the pixel's surface. Typically, if the pixel is a square with equal sides of 200 μm, it is essential to control the border's position with a precision of minimum 25 μm.

Restrictions Presented by BiNem Displays Created According to Prior Art

Creation of Gray Levels in Multiplexed Mode

For the BiNem displays, an electrooptical reference curve is defined: the optical state after switchover or percentage of texture T with relation to voltage V2L (FIGS. 4 and 6). This reference curve (produced with a voltage applied to the columns of zero value Vc=0) illustrated in FIG. 9, provides information about the parameters to be used for the display's multiplexing.

The voltage V2L was entered as abscissa for this FIG. 9 and the percentage of texture T as ordinate.

The presence of two possible operating points V2LG (left) and V2LD (right) can be observed. Those skilled in the art understand indeed that by making the voltage V2L evolve respectively from either side of these 2 operating points V2LG and V2LD, the percentage of texture T rapidly evolves between 100% and 0%, respectively 0% and 100%.

The precise display of the gray levels in multiplexing is carried out by modulating the parameters of the column signals, notably their voltage level and/or their duration, in order to move along the optical response curve around the chosen operating point.

A simplified example of the creation of gray levels by modulating the amplitude of the voltage of the column signals around V2LD is provided in FIG. 10, which comprises two parts, 10*a* and 10*b*. In the first part (FIG. 10*a*) the line voltage UI, in volt, has been entered as ordinates and, as abscissa, towards the right, the time t and on the left, the percentage of texture T. On the left of this diagram of FIG. 10*a*, curve 70 forms the electrooptical curve and point 72 is an operating point such that Vc=0 volts, this being 50% of texture T.

In the second part, 10_b_, the column voltage Vc has been entered as ordinates, in volt V, and as abscissa, on the right the time t and on the left, as in FIG. 10_a_, the percentage of texture T.

A column voltage Vci which is deducted from value $V2L_D$ of the operating point makes it possible to obtain, depending on the electrooptical response curve, a gray level comprising 60% of texture T inside the pixel. Furthermore, we obtain 30% or 90% of texture T with, respectively, column voltages Vck and Vcj.

Influence of the Average Quadratic Voltage RMS

It is observed on the BiNem cells a dependence of the value of the operating points with relation to the average voltage applied to the pixel before it receives the switchover signals, and particularly with relation to the square root of the average quadratic value (or RMS voltage for "Root Mean Square") of the voltage applied to the pixel before its switchover that we will call Vrmsac, defined by:

$$Vrmsac = \sqrt{\frac{\int_t^{t+\delta t} V^2(t)\,dt}{\int_t^{t+\delta t} dt}} \quad (1)$$

Indeed, the previously defined value of the RMS voltage before switchover determines the texture of the liquid crystal in the pixel in question before its switchover. As will be demonstrated, this initial texture influences directly the electrooptical curve obtained for the pixel in question.

In a multiplexed passive addressing, as described in the prior art, the value of the RMS voltage before switchover is variable. Indeed, if transistor-based "active matrix" technologies are not used, a pixel of a given line is subjected to all the voltages applied to the column in which it is located. FIG. 5 shows indeed that the pixel (n,m) at the intersection of the line n and the column m is subjected to all the voltages applied to the column m. The square root of the average quadratic voltage Vrmsac(n,m) applied to this pixel before its switchover, i.e. before the excitation of the line to which it belongs, depends notably on the voltages $Vcm_p$ applied to the column m during the addressing of the p lines preceding those of the pixel in question, such that p<n. The voltage Vrmsac(n,m) depends also on the column and line times, respectively $Tcm_p$ and $T_{ligne}$, according to the following formula (cf. formula 1):

$$Vrmsac(n, m) = \sqrt{\frac{1}{(n-1)\cdot Tligne}\sum_{p=1}^{n-1} Vcm_p^2 \cdot Tcm_p} \quad (2)$$

= Square root of the average quadratic voltage *RMS* seen by the pixel at the intersection of the line *n* and the column *m* before its switchover, =Square root of the average quadratic voltage RMS seen by the pixel at the intersection of the line n and the column m before its switchover, in which $T_{ligne}$ is the addressing time for a line (as defined in FIG. 8), this being: $T_{ligne}$=T1+T2+TL.

The value of Vrmsac typically varies between 0 Volts (for example for the pixels located on the first line of the screen in the direction of sweeping) and 3 Volts.

In the specific case of an addressing in black and white, only two possibilities of column signals are generally used, which have the same duration Tc and an equal absolute voltage value Vc (one alternation is positive, the other is negative). Vrmsac is then simplified according to the formula (3):

$$Vrmsac(n, m) = \sqrt{\frac{1}{(n-1)\cdot Tligne}\sum_{p=1}^{n-1} Vc^2 \cdot Tc} = Vc\cdot\sqrt{\frac{Tc}{Tligne}} \quad (3)$$

In this particular case, Vrmsac has a constant value.

In the case of an addressing aiming to obtain gray levels, the voltage and the duration of the column signal are adjusted with relation to the gray level "g" to be obtained. For 16 gray levels, 16 different voltage values $Vc_g$ and/or 16 different values of column pulse duration $Tc_g$ therefore exist. Each gray level "g" thereby brings its specific contribution to the voltage Vrmsac. The average quadratic voltage applied to a given pixel before its switchover depends therefore on the gray levels displayed on the previous pixels located on the same column according to the formula (2).

Influence of the Voltage Vrmsac on the Switchover of the Pixels of an Isolated Line A prototype of BiNem screens with definition of 16 lines×16 columns, brushed at 90° of the direction of line electrodes was created. The width of the column electrodes is approximately 0.27 mm, their length is approximately 5 mm, the isolation between columns is approximately 0.015 mm. The width of the lines is approximately 0.27 mm, their length approximately 5 mm, the isolation between lines is approximately 0.015 mm. The elementary pixel 80 is shown in FIG. 11 which shows an enlarged view of a part of the prototype. In this figure, direction D2 is the brushing direction. On the assembled cell, the brushing directions of the master and slave blades are parallel. The display is fitted with a rear reflector, a front polarizer and a front lighting device to operate in reflective mode:the texture T passes through (it appears pale), the texture U does not pass through (it appears dark). An adapted electronic control, delivering 16 line signals and 16 column signals, completes the device and enables the display's addressing in multiplexed mode.

The prototype's pixels are observed under a magnification compatible with the observation of the textures present on the pixels.

A voltage pulse Vpre=20 V and of duration 1 ms is sent throughout the full prototype prior to the addressing shown in FIG. 12 in order to switch all the pixels to texture T. This pulse will be called "pre-T".

We therefore position ourselves systematically in the observation of the switchover from an initial texture T to a texture U.

In this part, the case of the switchover of a line is focussed on, all other lines being connected to the mass.

The screen is addressed by line signals on the line 4 (L4) (FIG. 12_a_) and by identical column signals throughout all of the columns 1 to 16 (FIG. 12_b_). The signals applied are shown in FIG. 12.

V1L=20V; T1=500 μs; T2=750 μs; TL=50 μs;

The addressing signal of the line 4 is typically a signal with two levels V1L and V2L, whereby the value of V2L is adjusted here (V2L=11 V) to obtain a state U on all the pixels of the line 4.

The columns are addressed by means of a periodical signal of period $T_{ligne}$ (Tligne=1300 μs), in square voltage form, of amplitude $V_{adj}$ and of duration $T_{adj}$ (Tadj=750 μs), including p periods. This signal makes it possible to simulate pulses of column data type, similar to those actually seen by a pixel during multiplexed addressing. These pulses will be called "column pre-pulses". The adjustment of the voltage $V_{adj}$ thus enables the direct modification of the average quadratic voltage applied to the pixels of the line n before their switchover following the formula:

$$Vrmsac(\text{pixel}) = \sqrt{\frac{1}{(n-1)\cdot Tligne}\sum_{1}^{n-1}(Vadj^2\cdot Tadj)} = Vadj\cdot\sqrt{\frac{Tadj}{Tligne}} \quad (4)$$

FIG. 13 shows the effect obtained for different values of $V_{adj}$ on the T->U switchover of the pixels of the line 4 (n=4).

Under the same conditions the increase in the voltage Vrmsac applied to the pixels of the line 4 before the switchover modifies considerably their response to the addressing signals. For an increasing value of Vrmsac, the fraction of texture U obtained after the T->U switchover decreases.

It has been experimentally verified that the voltage threshold corresponding to the total disappearance of the texture U on the pixels of the line 4 with relation to the column pre-pulses depends on $V_{adj}$ and on the ratio $T_{adj}/T_{ligne}$ following a law of RMS type given by the formula (4).

The specific RMS value for the disappearance threshold of the texture U (in the example approximately 1.5V) is variable depending on the type of signals used (for example depending on the values of V1L, V2L, T1, T2 . . . ).

It has also been experimentally verified that the switchover mechanisms of the texture U to the texture T are affected in a similar manner by the presence of an average quadratic voltage applied to the pixels to be switched over, prior to the application of the switchover signal.

Influence of the Voltage Vrmsac in Multiplexed Addressing Mode: Simplified Case of an Image Uniform in T with the Exception of One Line During the addressing of a BiNem screen in multiplexed mode, a given pixel sees an average quadratic voltage due to the signals sent on the column on which it is located during the addressing of the previous lines.

By successively addressing the lines L1, L2 until L5 of the prototype of 16×16 pixels, the impact of the average quadratic voltage Vrmsac on the pixels of the line 5 with relation to the column data sent during the switchover of the lines 1 to 4 can be studied.

The diagrams in FIG. 14 show the signals used for this purpose.

The parameters are:

The pre-T signal similar to that described above, common to all the lines of the display, of amplitude Vpre=20V and of duration Tp=1 ms.

V1L=20V, V2L=6V

T1=500 μs, T2=750 μs, TL=50 μs, Tc=T2, therefore $T_{ligne}$=1300 μs $Vc_{1-4}$=Vc1=Vc2=Vc3=Vc4=−2V or −3V or −4V Vc5=4V The column voltage $Vc_{1-4}$ applied during the selection of the lines 1 to 4 is identical. It enables the switchover of these lines to texture T and adjustment of the value of the voltage Vrmsac(5) applied to the line 5. Therefore for:

−$Vc_{1-4}$=−2 V the voltage *Vrmsac*(5)=1.52V (according to the formula (2))

−$Vc_{1-4}$=3 V the voltage *Vrmsac*(5)=2.32V (according to the formula (2))

−$Vc_{1-4}$=4 V the voltage *Vrmsac*(5)=3.1V (according to the formula (2))

It should be noted that for the values of $Vc_{1-4}$ between −1V and −4V, the lines 1 to 4 always switchover to the texture T.

In this simplified case, the column voltage applied to all the columns during the selection of the line 5 is fixed at $Vc_5$=+4 Volts in order to switchover the whole of this line to a Uniform texture.

FIG. 15 shows the switchover results for the cell in multiplexing according to these signals when $Vc_{1-4}$ evolves from −2 V to −4V. More specifically, FIG. 15 shows the effects of the voltage Vrmsac on the switchover of the line 5 during a sweeping of multiplexed type by using the signals shown in FIG. 14 for three values of $Vc_{1-4}$.

It is clearly apparent that the value of the voltage Vrmsac applied to the pixels of the line 5 during a sweeping of multiplexed type influences their response to the switchover signals. The higher the amplitude of Vrms(5), the more difficult the switchover T→U on the line 5, which becomes impossible for the chosen values of V1L and V2L.

Modification of the Switchover Due to the Presence of a Voltage Vrmsac—Case of any Image In this part, the influence of the average quadratic voltage applied to a pixel before its switchover is presented, in the case where the switchover signal which is applied to this pixel takes different values $Vc_5$. This is the general case corresponding to the display of any image.

FIG. 16 shows the evolution of the changeover threshold of the texture T to the texture U on a pixel in the line 5, with regard to the value for the column voltage $Vc_5$ which is applied to it, and to the voltage Vrmsac applied to this latter before the switchover signal. In this diagram the value Vc5 for the line 5 has been entered in abscissa in Volt, and the percentage of texture T on the pixel as ordinates.

It is clearly apparent that when the voltage Vrmsac increases, the value of the column voltage $Vc_5$ to be applied to obtain, for example, 50% of texture T, also increases.

The disturbance of the switchover due to the voltage Vrmsac seen by the pixel results in a slip of the operating point as shown in FIG. 10.

It is understood that with such conditions it becomes impossible to control the gray levels on an image with precision.

Indeed, the application of a given column voltage will not result in a same fraction of texture U and of texture T in the pixel in question according to whether the column voltages applied to the previously addressed pixels were low or high, therefore according to the content of the image.

In the case of the display of an image with gray levels on a display comprising N lines and M columns, the pixel located at the intersection of the line n, 1≦n<N, and of column m, 1≦m<M, written P(n,m), has a gray level that will be written "g(n,m)".

The voltage $Vrmsac(n,m)^2$ applied to the pixel P(n,m) is then the sum of the contributions due to the signals applied on the column m during the addressing of the lines p such that p<n.

If we consider the gray level g(p,m) inscribed on the pixel P(p,m) located at the intersection of the line p<n and the column m, the contribution $Vcontrib_{g(p,m)}{}^2$ of the column signal (of voltage $Vc_{g(p,m)}$ and of duration $Tc_{g(p,m)}$) which was used to address this pixel, to $Vrmsac(n,m)^2$ seen by the pixel P(n,m) is defined by the following formula:

$$Vcontrib_{g(p,m)^2} = \frac{Vc_{g(p,m)^2} \cdot Tc_{g(p,m)}}{(n-1) \cdot Tligne} \quad (5)$$

The voltage Vrmsac seen by the pixel P(n,m) depends then on the gray levels displayed on the previous n−1 lines according to the formula:

$$Vrmsac(n, m) = \sqrt{\sum_{p=1}^{n-1} Vcontrib_{g(p,m)^2}} \quad (6)$$

Restriction of the Voltage Vrmsac Seen by the Display's Pixels

A first solution to resolve the restriction due to the voltage Vrmsac inherent in the addressing of a bistable screen in passive multiplexing mode would be to maintain the variations of this voltage beneath a given sufficiently low value. The inter-line time (and therefore the $T_{ligne}$) could for example be extended enough, whatever column voltage is applied, for the difference between the contributions to the voltage Vrmsac of each gray level to stay below the tenth of volt.

This method has the disadvantage of extending the addressing time for an image.

Standard Liquid Crystal Devices (TN and STN)

For monostable displays, i.e. displays of the Twisted Nematic (TN) type, or even of the Super Twisted Nematic (STN) as a non-restrictive example, the mixture of nematic thermotropic liquid crystals used is not sensitive to the absolute value of the voltage applied V(n, m) to the pixel in question, but to the square root of its average quadratic value insofar as the frequency f of the electric signal applied is such that $f>>(1/\tau)$, in which $\tau$ is the time characteristic of re-direction of the average direction of the molecules of the liquid crystal mixture. In both cases (TN and STN), the value of the average quadratic voltage applied to a pixel determines the texture of the liquid crystal and therefore the optical transmission of the pixel. The control of the value of the average quadratic voltage applied to a pixel (n, m) is therefore a requirement for nematic liquid crystal displays in the context of an addressing of "passive matrix" type [11].

The calculation of the square root of the average quadratic voltage applied to the pixel (n, m) factors takes into account, on one hand, the differences of potentials applied by means of all the column signals of the column m and, on the other hand and unlike the case of the bistable display, the difference of potentials on the line n at the time of its excitation, i.e. at the time when a line signal is applied to this line. The man of the art refers to the average quadratic voltage $V_{RMS}^{ON}(n, m)$ to maintain a pixel in the "on" state and of the average quadratic voltage $V_{RMS}^{OFF}(n, m)$ to maintain a pixel in the "off" state. Maintaining a given texture generating a white, black of grey optical state of any pixel is conditioned by the maintaining of an appropriate average quadratic voltage at each pixel's terminal. An identical average quadratic voltage on all the pixels creates a uniform gray on the whole screen.

SUMMARY

To overcome the disadvantages inherent in the prior art, the present invention provides a matrix display device with bistable nematic liquid crystal in which the average voltage, preferentially the square root of the average quadratic voltage applied to each pixel of the display before its switchover is rendered identical, independently of the content of the image to be displayed.

In the following, only the case of the equalization of the average quadratic voltage will be considered; but this example is non-restrictive, the equalization of a differently-calculated average voltage is also applicable.

In a passive multiplexed mode in which addressing is carried out line by line, the average quadratic voltage at the terminals of all the pixels of each line is fixed at a constant value at the moment preceding its excitation. It enables to obtain an identical texture of the liquid crystal molecules is for all the pixels in this line before its excitation. By this method, the present invention ensures the precise control of the switchover of each pixel in this line to a chosen texture. This applies so forth for each line.

The average quadratic voltage becomes null when the full bistable screen has been addressed, or when the part of this same screen which requires refreshing has been addressed.

According to the embodiments of the present invention:

- The choice of time boundaries for calculating the value of the fixed average voltage is arbitrary.
- The average quadratic voltage Vrmsac seen by each pixel of the display device before its switchover can be adjusted beyond the value imposed by the column addressing signals representing the image data and independently of the latter.
- The equalization signals of Vrmsac could be applied via the display's column signals, or even via a combination of the line and column signals.
- An embodiment of the present invention consists in the addition of an equalization signal of the voltage Vrmsac at each line time; for example this equalization signal is applied during the excitation time of the line, notably at the beginning of the line excitation signal.
- In the case where the equalization signal of the voltage Vrmsac is applied via the column signals, for each of the gray levels "g" to be reproduced in the image, a couple (column voltage $Vc_g$/column pulse duration $Tc_g$) would be typically defined to represent the image data, and a complementary couple (RMS equalization voltage $Vcomp_g$/RMS equalization duration $Tcomp_g$) would be typically defined to adjust the voltage Vrmsac to a value common to the full display, written Vrmsac*.

The voltage and RMS equalization signal duration values are thus adjusted for each gray level with relation to the required Vrmsac* value.

- The RMS equalization signal will be able for example to be calculated for all the gray levels "g" by maintaining the voltage Vcomp constant and adjusting the duration $Tcomp_g$, or by maintaining the duration Tcomp constant and adjusting the voltage $Vcomp_g$.
- It could also be chosen to vary both $Vcomp_g$ and $Tcomp_g$, or to vary the value of the voltage applied to all or part of the line electrodes, or a combination of these different possibilities.
- The equalization value Vrmsac* is greater than or equal to 1V.
- Another embodiment of the present invention consists in the addition of an equalization signal of the voltage Vrmsac every p line, with p>1.

For example, the equalization signal is applied during the excitation time of the line in question (one line every p line), for example at the beginning of the line excitation signal.

The Vrmsac equalization signal via the column signals can be carried out while none of the screen's physical lines is addressed, during the addressing of said 'virtual' lines.

The line's excitation signal is bipolar, such that the average voltage seen by the pixel is limited in order to prevent electrochemical damage for the liquid crystal, and the equalization signal is applied during the first polarity of the line excitation signal.

The present invention proposes to control the average quadratic value applied to each pixel of a bistable display before its switchover to a constant value at a given temperature. The present invention is totally different from the techniques used for standard displays (TN and STN for example). For standard displays, the square root of the average quadratic voltage has to imperatively take into account the difference in potentials applied to the selected line. Furthermore, for standard displays, a constant average quadratic voltage at the terminals of a pixel amounts to obtaining a state that is always identical on the pixel in question.

A first advantage of the regulation of the square root of the average quadratic voltage applied to each of the display device's pixels before its switchover is the clear improvement in image uniformity. Any variation in switchover thresholds due to variations in the voltage Vrmsac from one pixel to another on one same column is indeed controlled.

A further advantage of the present invention is that a line's addressing time does not need to be extended to obtain an accurate reproduction of the gray levels.

A further advantage of the present invention is the simplicity of its implementation. Indeed, the regulation of the square root of the average quadratic voltage seen by each pixel of the display device before its switchover does not necessitate additional image memory, nor does image information for the previous lines or for the previous field need to be taken into account.

A further advantage of the present invention, is that the regulation of the voltage Vrmsac makes it possible to remedy the non uniformities of the operating points generated by other variable parameters of the display.

The invention thus relates to, generally speaking, an addressing method for a bistable nematic liquid crystal matrix screen presenting two stable textures without electric field applied, this screen comprising two substrates between which the liquid crystal is placed, the first substrate comprising lines addressing electrodes and the second substrate comprising columns addressing electrodes, the addressing of the pixels being of passive multiplexed type, the lines being addressed one by one while all the columns are simultaneously addressed during the excitation time of each line, the switchover of each pixel from one state to another being commanded by an electric switchover voltage applied between the substrates at the level of the corresponding pixel at the time of its switchover.

The method according to the invention is characterised in that an electric voltage applied between the substrates is chosen for each pixel such that an average time value of this voltage, preferably the average quadratic value, from the beginning of the image display command until the moment immediately preceding the switchover, presents a predetermined and independent value of the information to be displayed, which is the same for all the image's pixels.

In one embodiment, the average electric voltage is at least equal to the maximum average electric voltage that can be obtained with the display of the uniform gray level giving the highest contribution to the average voltage in question.

In one embodiment, to obtain the predetermined value of the average voltage, at least one equalization pulse is applied to the column corresponding to the pixel for which switchover is required.

In this case, according to one embodiment, to obtain the same predetermined value of the average voltage at each line, each line is supplied with at least one equalization pulse.

According to one embodiment, the at least one equalization pulse is applied to the column corresponding to the pixel during the excitation of the line of the corresponding pixel.

According to one embodiment, to obtain the required gray level on each pixel, is applied on the column corresponding to the pixel, a selection pulse for the required texture which is preceded by at least one equalization pulse, the selection pulse and the at least one equalization pulse having voltages such that the average corresponds to the average voltage of predetermined value. In this case, the equalization pulse is, for example, applied during the excitation of the line of the pixel to be switched over, notably during the beginning of the excitation of the line of the pixel to be switched over.

According to one embodiment, the excitation signal for the line presents two successive parts with different polarities and the equalization signal is applied during the first part of the excitation signal.

In one embodiment, to obtain said predetermined value for the average voltage, the at least one equalization pulse is applied to the column corresponding to the pixel during the excitation of a line preceding the line of the corresponding pixel. For example, the equalization pulses are applied during the excitation of a line on p, p being a predetermined number greater than 1.

In one embodiment, to obtain said predetermined value of the average voltage, the at least one equalization pulse is applied between the excitation signals of two consecutive lines, this equalization pulse being thus applied in the absence of line excitation signals. For example, the equalization pulses are applied according to a period corresponding to the period separating a predetermined number p' of lines.

In one embodiment, to obtain said predetermined value for the average voltage, at least one equalization pulse is applied to the columns, prior to the excitation signal of the first line.

In one embodiment, the average value required for the voltage on each pixel, immediately before the switchover of this pixel, is obtained by choosing the amplitude and/or the duration of the equalization pulses periodically applied.

In one embodiment, prior to the display in multiplexed mode of each image, a signal is applied to all the pixels giving them the same state, i.e. the same texture.

In one embodiment, to modify an image part comprising a determined number of pixels, this determined number of pixels is subjected to equalization pulses.

In one embodiment, the respective twisting of the two stable textures of the liquid crystal approximately differ by plus or minus 180°. For example, the first texture is uniform or slightly twisted.

The invention also relates to a display device using the above-defined addressing method and comprising a bistable nematic liquid crystal matrix screen, this screen comprising two substrates between which the liquid crystal is placed, the first substrate presenting lines addressing electrodes and the second substrate comprising columns addressing electrodes.

BRIEF DESCRIPTION OF THE DRAWINGS

Other features, objects and advantages of the present invention will become apparent from the following detailed description and from the annexed drawings, which are provided as non-restrictive examples and in which:

FIG. 18 shows an example of the implementation of the equalization of the voltage Vrmsac according to an embodiment of the invention on a BiNem 160×160 display in multiplexed mode, FIG. $18_1$ shows an example of the addressing diagram implementing the equalization of the voltage Vrmsac according to another embodiment of the invention in which the column equalization pulse is inserted every p line, with p=4, FIG. $18_2$ shows an example of the addressing diagram implementing the equalization of the voltage Vrmsac according to a still further embodiment of the invention in which the column equalization pulse is inserted every virtual line, with a virtual line every 3 physical lines.

DETAILED DESCRIPTION

A according to the invention.

VARIANT 1

Example of Equalization of the Voltage Vrmsac Seen by the Pixels of the Display at the Vrmsac*=Vrmsac(max) Value, with Fixed Vcomp Vrmsac(max) is defined as being the maximum voltage Vrmsac that is obtained displaying the gray level which gives the highest contribution to the voltage Vrmsac.

In this example, the voltage Vrmsac* seen by each of the display's pixels is maintained equal to Vrmsac(max) by adding an equalization signal suitable for each gray level.

Figure 1:
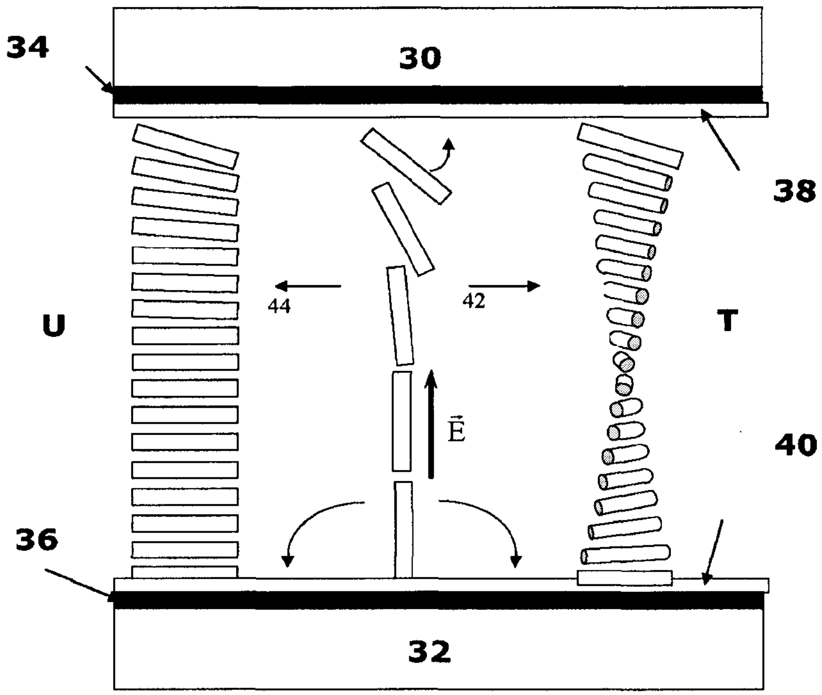
FIG. 1 shows the operating principle for a display of BiNem type.
Figure 2:
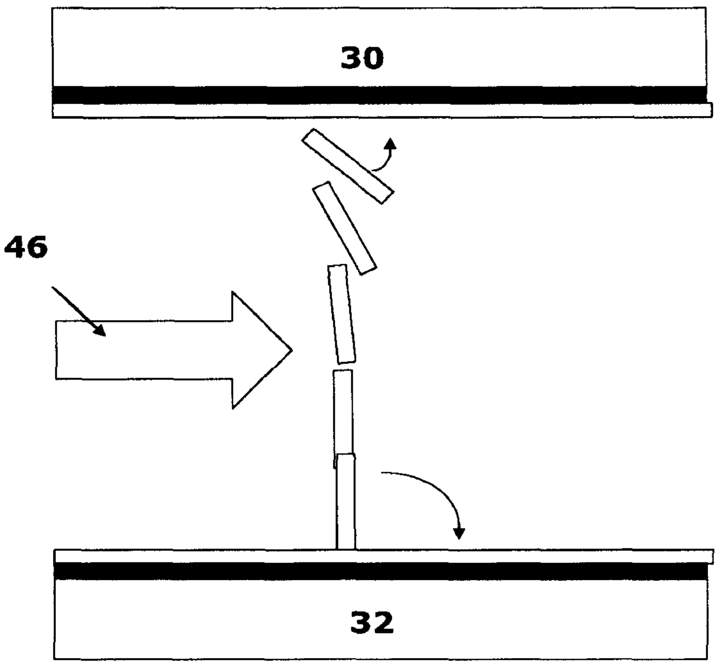
FIG. 2 represents the hydrodynamic flow present in the cell when there is a sudden interruption of the electric field.
Figure 3:
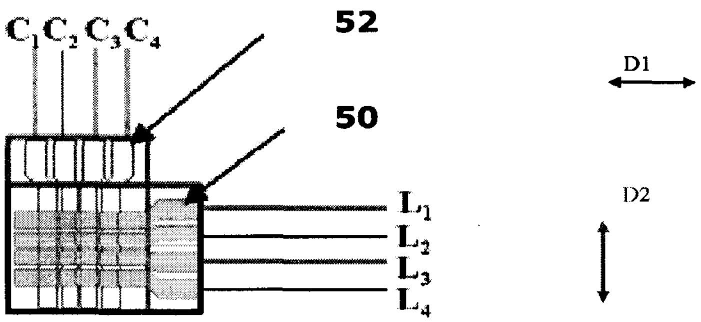
FIG. 3 shows a BiNem display with 4 lines×4 columns in accordance with prior art.
Figure 4:
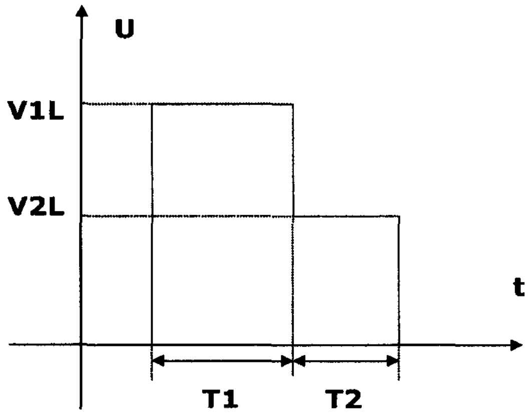
PRIOR ART Figure 4 :
FIG. 4 shows the control signals for the simultaneous switchover of the pixels of one same line.
Figure 5:
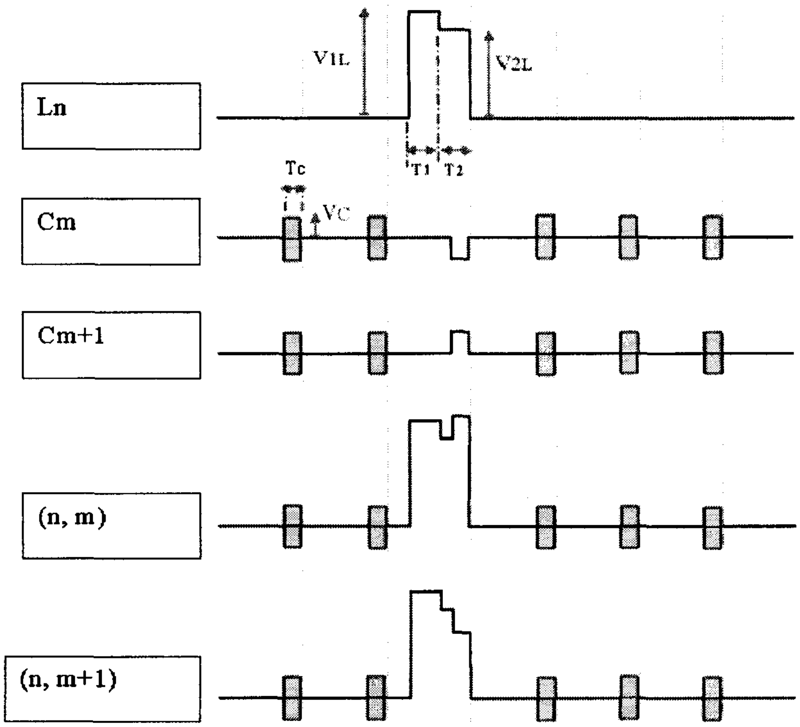
FIG. 5 shows the signals used for multiplexing a BiNem screen.
Figure 6:
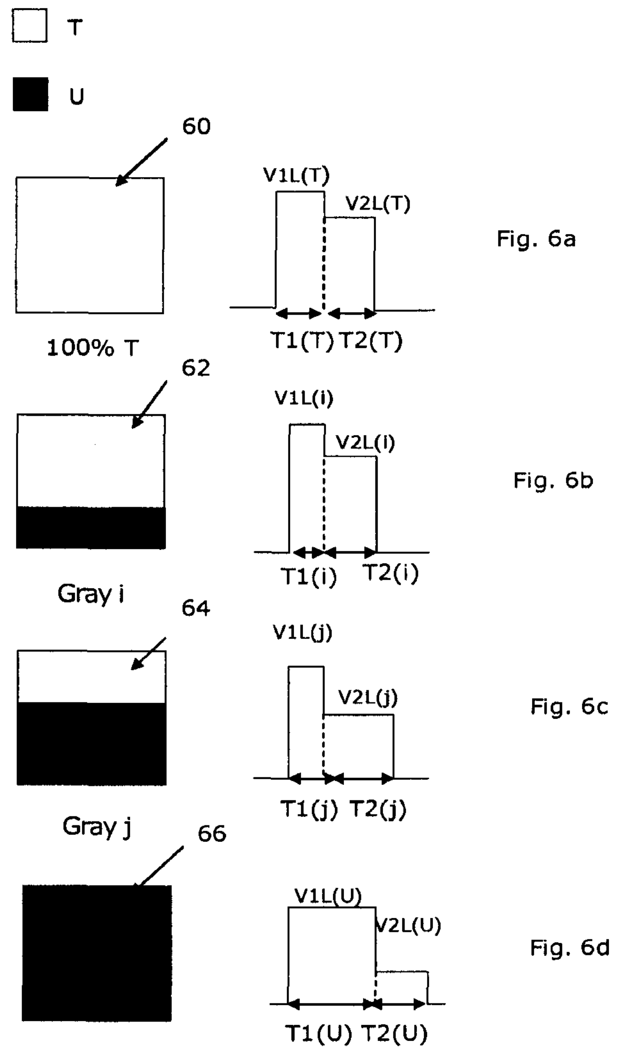
FIG. 6 shows the principle for creating gray levels according to prior art.
Figure 7:
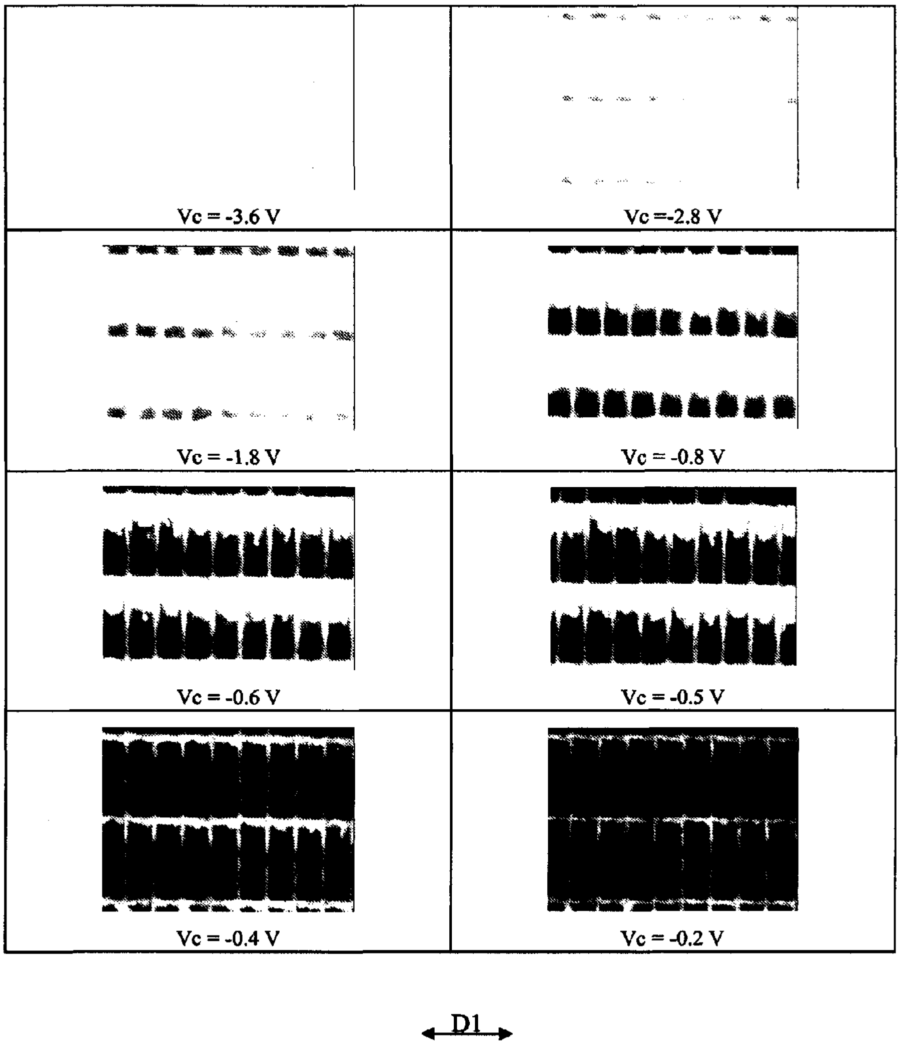
FIG. 7 shows the optical state of the pixels of a 160×480 display according to prior art with relation to the addressed column voltage Vc.
Figure 8:
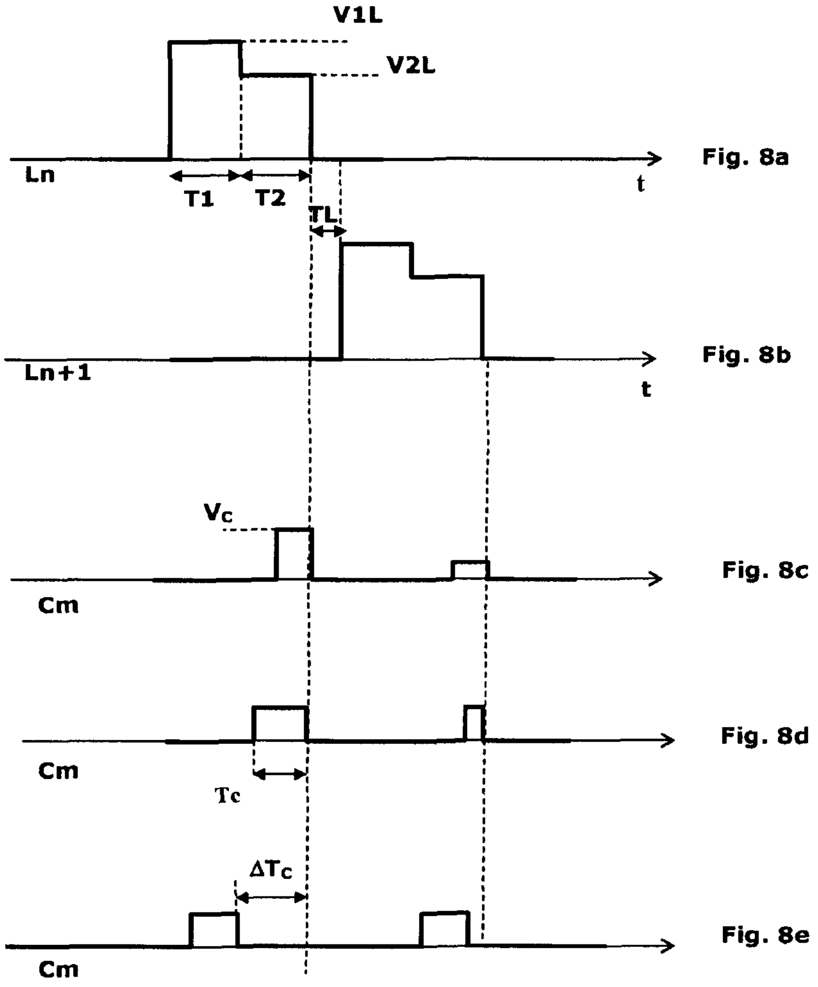
FIG. 8 shows an example of modulation of the column signal parameters for the creation of gray levels by "curtain effect" according to prior art.
Figure 9:
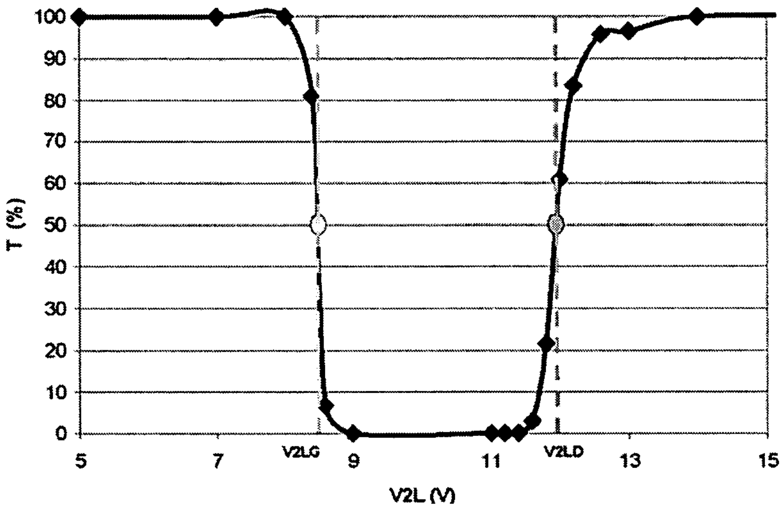
FIG. 9 shows an example of an electrooptical curve for a BiNem display.
Figures 10, 10A, 10B:
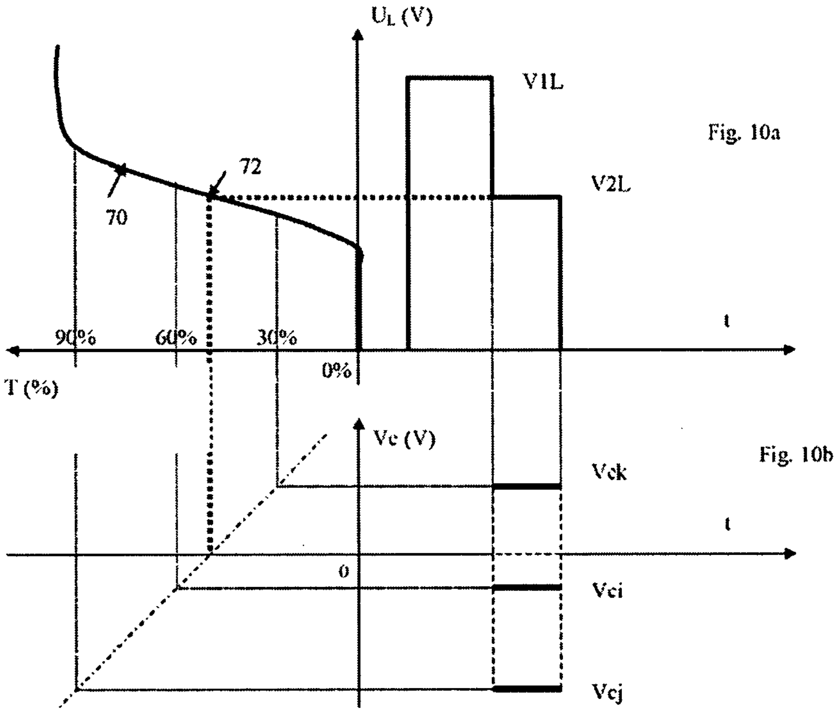
FIG. 10 shows the principle for obtaining gray levels along the electrooptical curve for a BiNem display by modulation of the amplitude of the column voltages.
Figure 11:
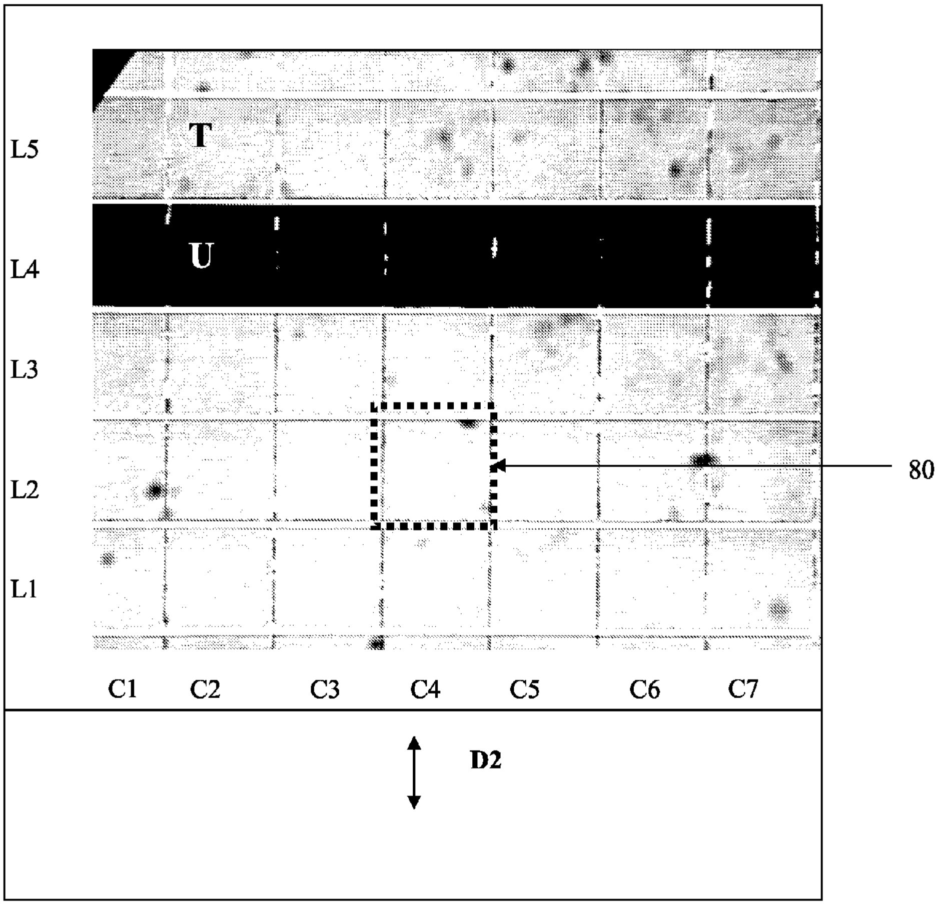
FIG. 11 shows the switchover of the pixels in multiplexed mode with a BiNem display.
Figures 12, 12A, 12B:
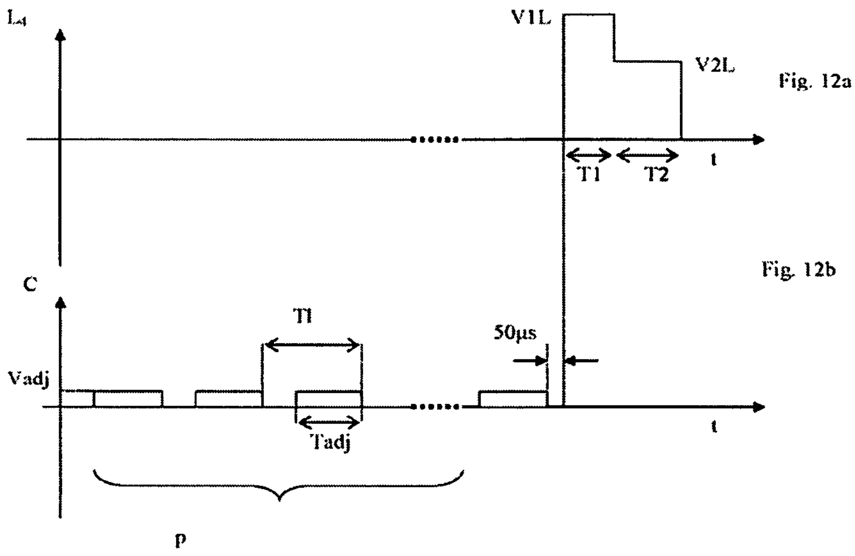
FIG. 12 shows the signals applied to the columns and to the line 4 of the 16×16 prototype.
Figure 13:
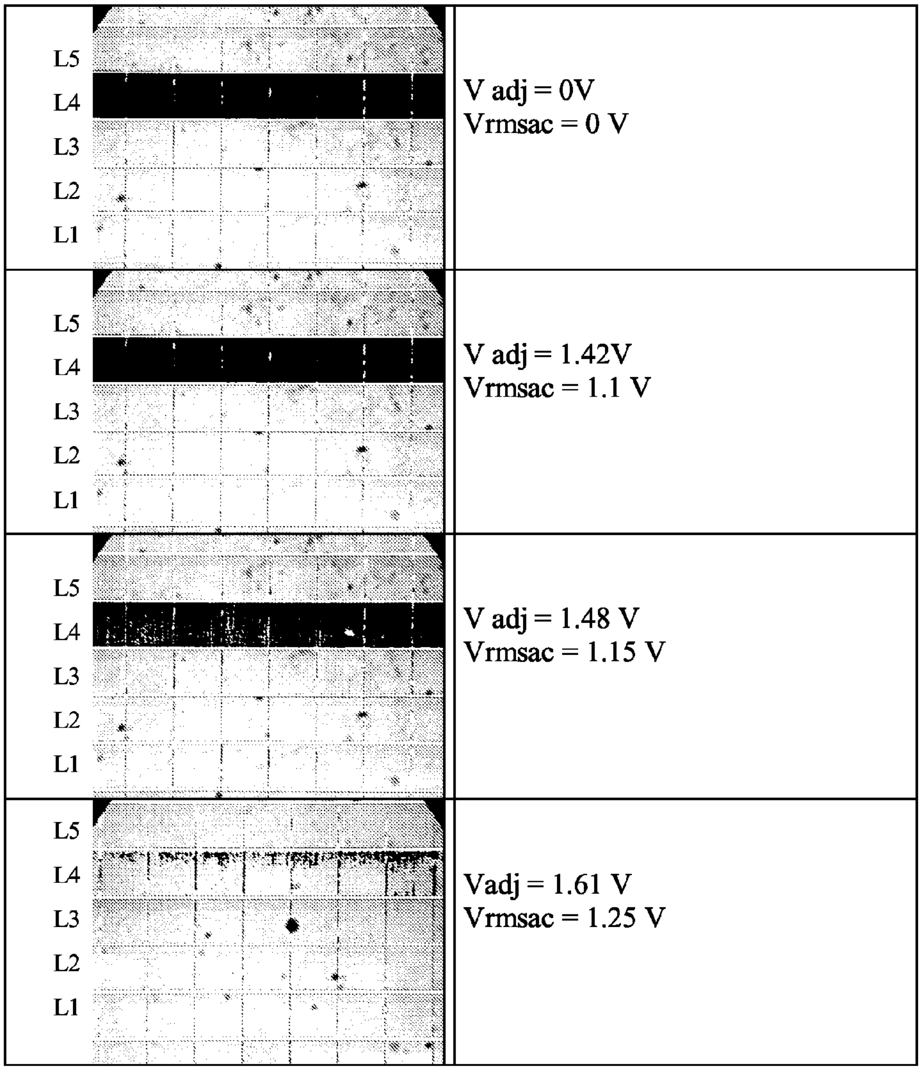
FIG. 13 shows the effects of the voltage Vrmsac on the switchover of the line 4, by using the signals of FIG. 12.
Figure 14:
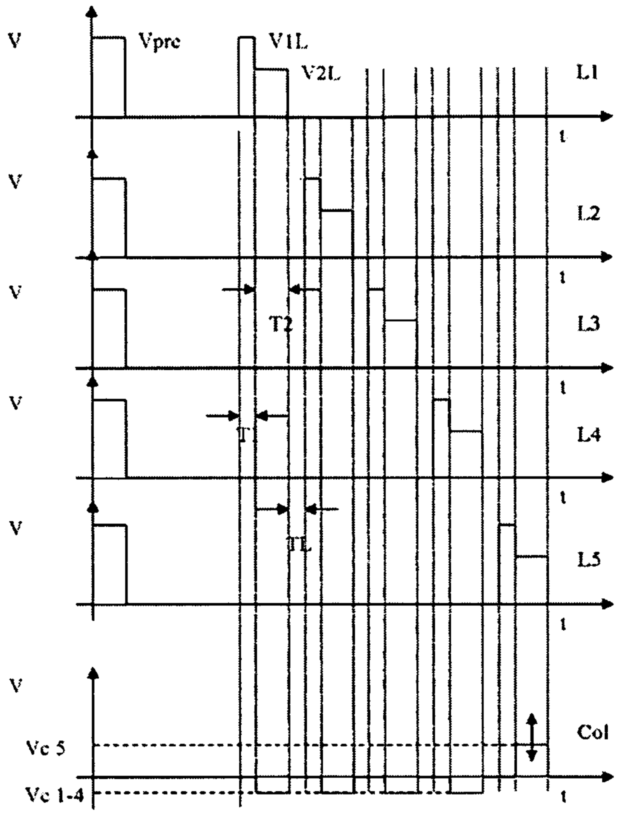
FIG. 14 shows the signals used for a sweeping of multiplexed type.
Figure 15:
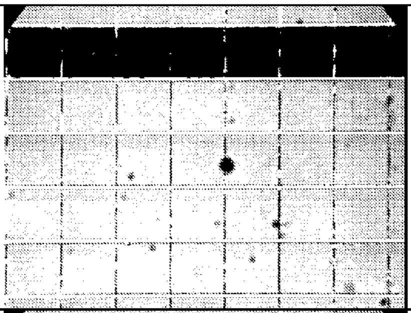
FIG. 15 shows the effects of the voltage Vrmsac on the switchover of the line 5, during a sweeping of multiplexed type, using the signals described in FIG. 14, for 3 values of $Vc_{1-4}$.
Figure 15:
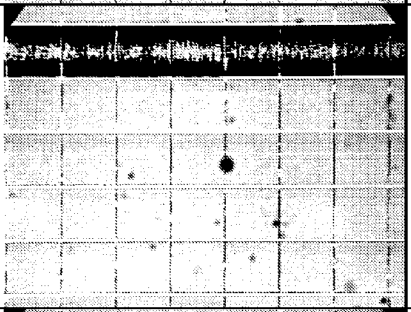
Figure 15:
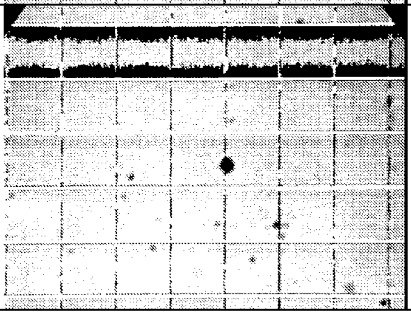
Figure 16:
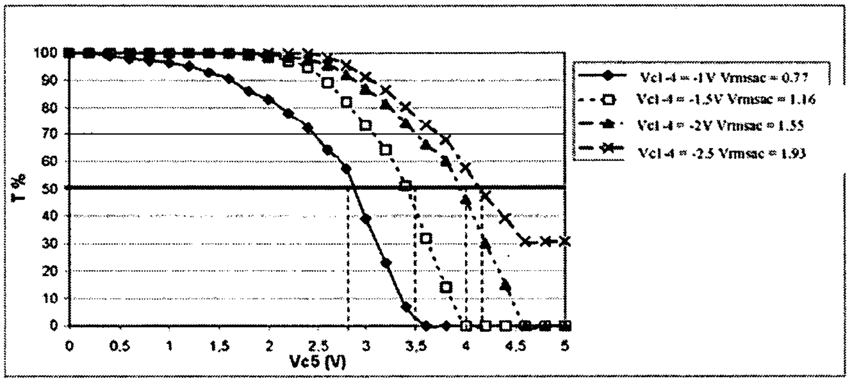
FIG. 16 shows the evolution of the T->U switchover thresholds with relation to the voltage Vrmsac seen by the pixel.
Figure 17A:
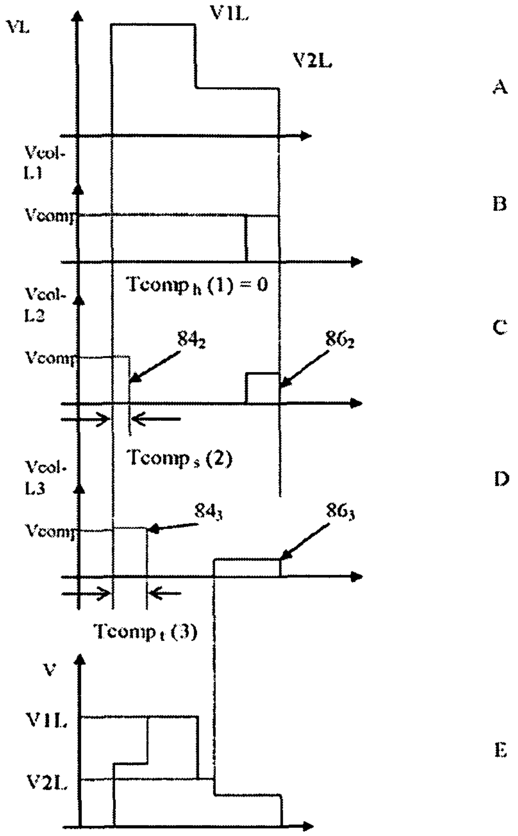
FIG. 17*a* shows an example of the addressing diagram implementing the equalization of the voltage Vrmsac according to an embodiment of the invention, in which the column equalization pulse is inserted every line.
Figure 17B:
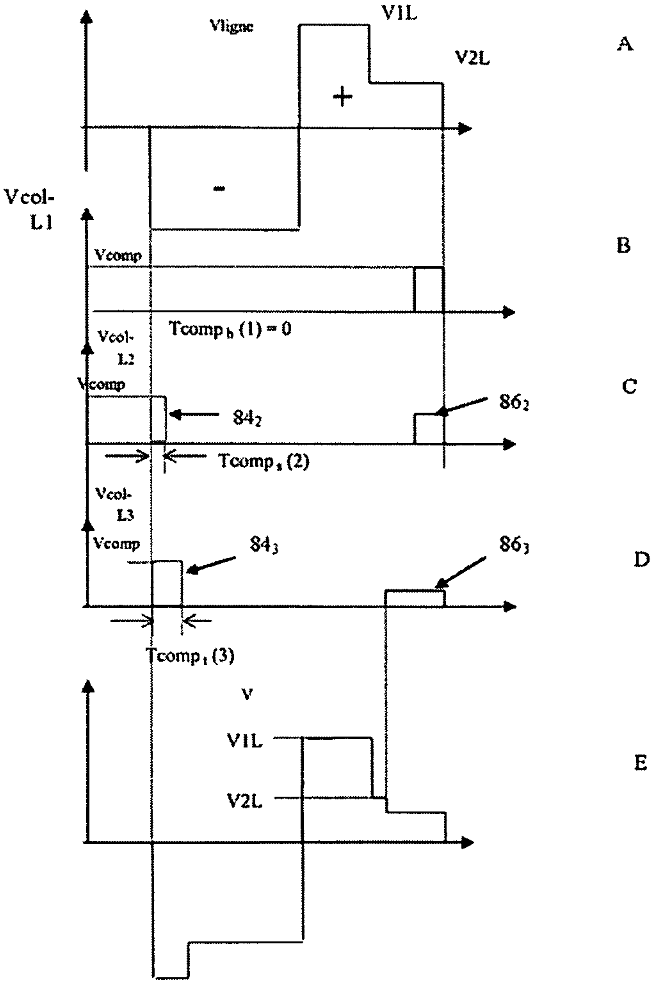
FIG. 17*b* shows an example of the addressing diagram implementing the equalization of the voltage Vrmsac according to an embodiment of the invention, in which the column equalization pulse is inserted every line and in which the excitation signal of the line is bipolar.

An example of signals implementing the equalization of voltage Vrmsac according to this variant is shown in FIGS. 17*a* and 17*b*.

For this example, the gray level "h" is to be determined first, for which the parameters $Vc_h$ and $tc_h$ give the maximum contribution to the voltage Vrmsac, which determines Vrmsac(max):

$$Vrmsac^{*2} = Vrmsac(\max)^2 = \max(Vc_g^{\,2} \cdot Tc_g / T\text{ligne}) = Vrms_h^{\,2} \tag{10}$$

Then, in this example, the equalization at Vrmsac* is carried out at each line:

$$Vrmsac(n, m) = \sqrt{\frac{1}{(n-1)\cdot Tligne}\sum_{p=1}^{n-1} Vrmsac^{*2}\cdot Tligne} \tag{10$_a$}$$

To do so for each gray level "g", the duration of the equalization signal to be applied is calculated with relation to the fixed Vcomp, Vcomp being a compensation or equalization voltage.

$$T\text{comp}_g = (Vrmsac^{*2} \cdot T\text{ligne} - Vc_g^{\,2} \cdot Tc_g) / V\text{comp}^2 \tag{11}$$

The Vcomp voltage could be chosen equal to any value permitting the complete equalization of the voltage Vrmsac for all the gray levels.

Thus, the contribution to the total square voltage Vrmsac brought by the column signals corresponding to each gray level, written $Vrms_g^{\,2}$, will be constant:

$$\begin{aligned} Vrms_g^2 &= (Vc_g^2 \cdot Tc_g / Tligne) + (Vcomp^2 \cdot Tcomp_g / Tligne) = \\ &(Vc_g^2 \cdot Tc_g / Tligne) + [Vcomp^2 \cdot \\ &(Vrms^{*2} \cdot Tligne - Vc_g^2 \cdot Tc_g) / Vcomp^2 / Tligne] = \\ &Vrmsac^{*2} = Vrmsac(\max)^2 \end{aligned} \tag{12}$$

The signal applied to a column of the display is therefore, for each line, made up of two parts: one "useful" part which is used to select the gray level to be displayed, and an equalization of the voltage Vrmsac part to make its value uniform throughout the full display device.

These two parts of the column signal depend solely on the gray level to be displayed. They are independent from the pixel's position on the display, or from the content of the image to be displayed outside of the pixel in question.

On the diagrams in FIG. 17*a*, part A shows the variation of the line voltage with relation to time t, part B shows the column voltage Vcol for the line 1 with Vrmsh=Vrmsac(max) for the gray level "h". On parts C and D, an equalization pulse $84_2$ and $84_3$ is shown for the gray levels respectively "s" and "t", and a column pulse, respectively $86_2$ and $86_3$ imposing gray levels "s", for the pulse $86_2$ and "t" for the pulse $86_3$. It can be noted that in part B concerning the line 1, there is no equalization pulse for the level "h".

On this diagram in FIG. 17*a*, part E shows finally the signal seen by the pixels of the line 3. This signal is equal to Vligne–Vcolonne line 3.

The variation represented in FIG. 17*b* is analogous to the one represented in FIG. 17*a*; it differs in that the line signal excitation is bipolar as shown in part A of FIG. 17*b*. The other parts B, C, D, E correspond to the parts with the same references in FIG. 17*a*. Thus, provision is made for equalization pulses $84_2$ and $84_3$ as well as pulses $86_2$ and $86_3$ to impose the gray levels, respectively "s" and "t".

In the example in the table (1), Vrmsac(max) is equal to 1.5 V and obtained for the grey 0 or 7. By fixing Vcomp=3V, the formula (11) is used to calculate $Tcomp_g$ for each gray level "g" given in the table (1):

The voltage $Vc_g$ to be applied to the columns to obtain the gray level g is experimentally determined.

TABLE (1)

| Gray level "g" | % of texture T | $Vc_g$ (V) | Vrmsac* (V) | Vcomp (V) equalization signal | $Tcomp_g$ (μs) equalization signal |
|---|---|---|---|---|---|
| 0 | 0 | 2 | 1.5 | 3 | 0 |
| 1 | 14 | 1.4 | 1.5 | 3 | 163 |
| 2 | 29 | 0.9 | 1.5 | 3 | 272 |
| 3 | 43 | 0.3 | 1.5 | 3 | 326 |
| 4 | 57 | −0.3 | 1.5 | 3 | 326 |
| 5 | 71 | −0.9 | 1.5 | 3 | 272 |
| 6 | 86 | −1.4 | 1.5 | 3 | 163 |
| 7 | 100 | −2 | 1.5 | 3 | 0 |

Choice of Column Pulse Parameters for the Equalization of the Voltage Vrmsac

Insertion of the Column Equalization Pulse at Each Line Time

In a first option, the column equalization pulse for Vrmsac is inserted at each line time.

The position of the column equalization pulse for Vrmsac could be chosen at any point during the time line, provided that it does not overlap the column selection signal representing the image data. The equalization column signal is applied near the beginning of the line's excitation signal, as shown in FIGS. 17*a* and 17*b*.

Preferably, it will be positioned, if the interlineation time permits, during the line space time TL, or at the beginning of the line time, during the anchoring breaking phase (V1L, T1).

The voltage Vcomp (or more generally, the voltages $Vcomp_g$ for each gray level) could for example be chosen equal to the maximum voltage authorised by the column drivers (which will be called $V_{driver\_max}$).

Nevertheless, it can be noted that, depending on its position, the column signal due to Vcomp might interfere with the signals dedicated to the addressing. This is the case if it is located at the beginning of the line signal, during the anchoring breaking phase (V1L, T1). It is understood indeed that when the voltage Vcomp is present on the columns, the liquid crystal is subjected to a total voltage equal to the difference between Vligne and Vcomp.

In the case of FIGS. 17*a* and 17*b*, it is apparent that the voltage applied to the pixels of the line 3 is equal to (V1L–Vcomp) throughout the duration of the signal Vcomp.

The characteristics of the selection signal (anchoring breaking) are modified therefore.

Advantageously, a voltage polarity for the signal Vcomp opposing that of the line voltage could be chosen, such that during the presence of the column signal ($Vcomp_g$, $Tcomp_g$), the total absolute voltage seen by a pixel would be greater than the anchoring breaking voltage represented by V1L.

In one variation (not shown) of FIGS. 17*a* and 17*b*, compensation signals of negative polarity are chosen, thus permitting the obtaining of a total voltage seen by the pixels of the line 3:

$$Vpixel=(V1L-Vcomp)=(V1L+|Vcomp|)>V1L \quad (13)$$

where |Vcomp| is the absolute value of Vcomp.

A low Vcomp value could also be chosen to minimise the interference with the signals dedicated to the addressing. Choosing a low Vcomp value also enables the obtaining of a time pitch required for the higher $Tcomp_g$ (formula (11)), which facilitates the implementation of the electronic control of the column drivers.

In certain cases, it could be chosen to alternate the polarity of Vrmsac equalization signals to limit the effects of the migration of electric charges within the liquid crystal and thus increase the display's life span. This embodiment is particularly advantageous in the case of a display with high speed, for example to display video. The mode of alternating the polarity for column equalization pulses of Vrmsac could be chosen, according to prior art, at each field, at each line, or according to any time period.

Furthermore, the line's signal excitation can be bipolar, in such a way as to limit the average voltage seen by the pixel, which will prevent electrochemical damage occurring on the liquid crystal, and the equalization signal is applied during the first polarity of the line signal excitation, as shown in FIG. 17*b*. The format for the first polarity is not restricted to the format shown in FIG. 17*b*, a format with two levels is also possible for example.

FIGS. 18*a* and 18*b* shove an example of the creation of equalization of Vrmsac with Vrmsac*=Vrmsac(max) on a display of 160×160 pixels. The dimensions of the pixels are identical to those in the prototype described above.

The following signals are used:

Line Signal:

V1L=V2L=18V

T1=T2=500 μs

TL=80 μs

Column Signals:

Signal Giving T (Pale Texture):

$Vc_1$=2V; $Tc_1$=300 μs; $Vrmsac_1$=1.05 V

Signal Giving U (Dark Texture):

$Vc_2$=5V; $Tc_2$=180 μs; $Vrmsac_2$=2.04 V

Signal Giving the RMS Equalization for Texture T:

$Vcomp_1$=5V; $Tcomp_1$=130 μs;

The purpose of this is to inscribe an image comprising a dark strip (texture U) on a pale background (texture T).

On FIGS. 18*a* and 18*b* arrow D corresponds to the direction of line sweeping.

FIG. 18*a* shows the image obtained when the equalization of the voltage Vrmsac is riot activated: it can be noted that the changeover to texture T is not complete. All the lines that should theoretically be at 100% in T (pale) present a non-null and variable proportion of texture U, in the form of little dark strips.

FIG. 18*b* shows the image obtained when equalization of the voltage Vrmsac according to the invention is activated. The following will be chosen:

Vrmsac*=Vrmsac(max)=$Vrmsac_2$=2.04V.

To the column signal producing T is added a RMS equalization column pulse with amplitude Vcomp=5V and duration $Tcomp_1$=130 μs. The voltage Vrmsac seen by all the display's pixels is then equal to 2.04 V. All lines that should be pale are correctly at 100% in T, no more dark parts are distinguished in U.

Insertion of the Column Equalization Pulse Every p Line

In a second option, the column equalization pulse is inserted every p line.

FIG. $\mathbf{18}_1$ shows the implementation of the equalization of Vrmsac according to this option. In this example, p=4 will be chosen: nothing is inserted during the addressing of the lines n, n+1, n+2, then the equalization signal is inserted in the column signal during the addressing of the line n+3, and so forth until the last line. On the lower diagram in this FIG. $\mathbf{18}_1$, pulses 92 and 94 are compensation column pulses for the voltage Vrmsac.

Evidently, comparatively to the first option, the equalization voltage parameters are different, since their calculation factors in the contributions of the column voltages on p lines and not for one line.

Insertion of the Column Equalization Pulse at Virtual Lines

The first option previously described enables equalization of the average quadratic voltage applied to the pixels prior to the application of the line selection signal. It revolves around the addition of pulses on the columns at moments such that they do not interfere with the "useful" pulses (image information). This technique becomes complex when the duration of line addressing is comparable to the duration of the column signal for texture selection. In this case, it is impossible not to superimpose the influence of the selection pulse with that of the equalization pulse.

A third option is to use the addressing time for a line to apply a Vrmsac equalization voltage to the columns, and by applying no other line selection voltage during this line period. This technique comes down to address a "virtual" line (with an equalization voltage) for each block of p physical lines, p≧1.

FIG. $\mathbf{18}_2$ shows such a method advocating the use of virtual lines, with p=4. Every 4 physical lines, the equalization $\mathbf{92}_1$, $\mathbf{94}_1$, via the column voltage is carried out during the addressing of the virtual line. In this FIG. $\mathbf{18}_2$, the lines $L_{n+3}$ and $L_{n+7}$ are virtual.

The advantage of this embodiment is that it also renders possible the equalization of the Vrmsac value of the voltage applied to the pixels before the application of a switchover signal, even in the cases where the line period is lower than the sum of selection pulse and equalization pulse durations.

A disadvantage of this embodiment is that it extends the refresh time for the whole screen by a duration that is proportional to the refresh time for a line and to the quotient of the number of a block's lines p by the total number of the screen's lines.

It can be noted that the use of pre-pulses applied before the excitation of the first line of a display, is in part based on this method.

VARIANT 2

Example of Equalization of the Voltage Vrmsac Seen by the Display's Pixels at the Vrmsac*=Vrmsac(max) Value, with Fixed Tcomp In an embodiment of the equalization of the voltage Vrmsac, it could be chosen to fix Tcomp at a given value, then for each grey level "g", to calculate the voltage $Vcomp_g$ of the equalization signal to be applied with relation to the fixed Tcomp and the Vrmsac*=Vrmsac(max):

$$Vcomp_g^{\,2}=(Vrmsac^{*2}\cdot Tligne-Vc_g^{\,2}\cdot Tc_g)/Tcomp \qquad (14)$$

The considerations concerning the choice of Tcomp are similar to those exposed in variant 1.

Thus, the contribution to the total voltage Vrmsac brought by the column signals corresponding to each of the grey levels will be constant:

$$\begin{aligned} Vrms_g^2 &= (Vc_g^2\cdot Tc_g/Tligne)+(Vcomp_g^2\cdot Tcomp/Tligne) \qquad (15)\\ &= (Vc_g^2\cdot Tc_g/Tligne)+\\ &\quad \left[Tcomp\cdot\left(\begin{matrix}Vrms^{*2}\cdot Tligne-\\ Vc_g^2\cdot Tc_g\end{matrix}\right)\Big/Tcomp\Big/Tligne\right]\\ &= Vrmsac^{*2} \end{aligned}$$

This embodiment may be more suitable for a simplified control of the column driver management.

This method is compatible with the various options previously described: insertion of the equalization every line, every p lines or every virtual lines.

VARIANT 3

Adjustment of the Voltage Vrmsac Seen by the Pixels of the Display at a Vrmsac*>Vrmsac(max) Value In the example of variants 1 and 2, the Vrmsac* chosen value used is the maximum value present in the image data. This value can be adjusted to a higher voltage Vrmsac*. An advantage of proceeding thus lies in the control of the position of the switchover threshold from T to U to optimise the quality of the display.

Using the above example, the following would then be obtained:

$$Vrmsac^{*2}=\max(Vc_g^2\cdot Tc_g/Tligne)+Vrms_0^2=Vrmsac(\max)^2+Vrms_0^2 \qquad (16)$$

in which $Vrms_0$ is a value that has been freely chosen to adjust the Vrmsac*.

The remaining calculations are then identical to those given by the formula (11) in the case of an adjustment at constant Vcomp, or to the formula (14) in the case of an adjustment at constant Tcomp.

This method is compatible with the various different options described above: insertion of equalization every line, every p lines, or every virtual lines.

VARIANT 4

Equalization of the RMS Voltage Seen by the Pixels of the First Lines Addressed In this variant of the present invention, it is proposed to add column pulses corresponding to t "virtual" lines before the excitation of the first line of the screen. This embodiment enables the adjustment of the voltage which will be seen by the first lines of the display. It could be used to complement, or independently of, the equalization principle of the RMS voltage described above.

Indeed, when the display of an image starts, the first line of the screen sees a null voltage prior to the application of the switchover signal, even when the equalization of RMS is used.

This phenomenon results in disturbance and non-uniformity of the gray levels at the beginning of the image.

Experimentally, it has been noted that this phenomenon extends to a dozen of lines at the beginning of image display.

We therefore propose that the equalization principle of the RMS be extended by adding column pre-pulses in view of stabilizing the value of the RMS voltage before the effective start of an image's sweeping.

Figure 19:
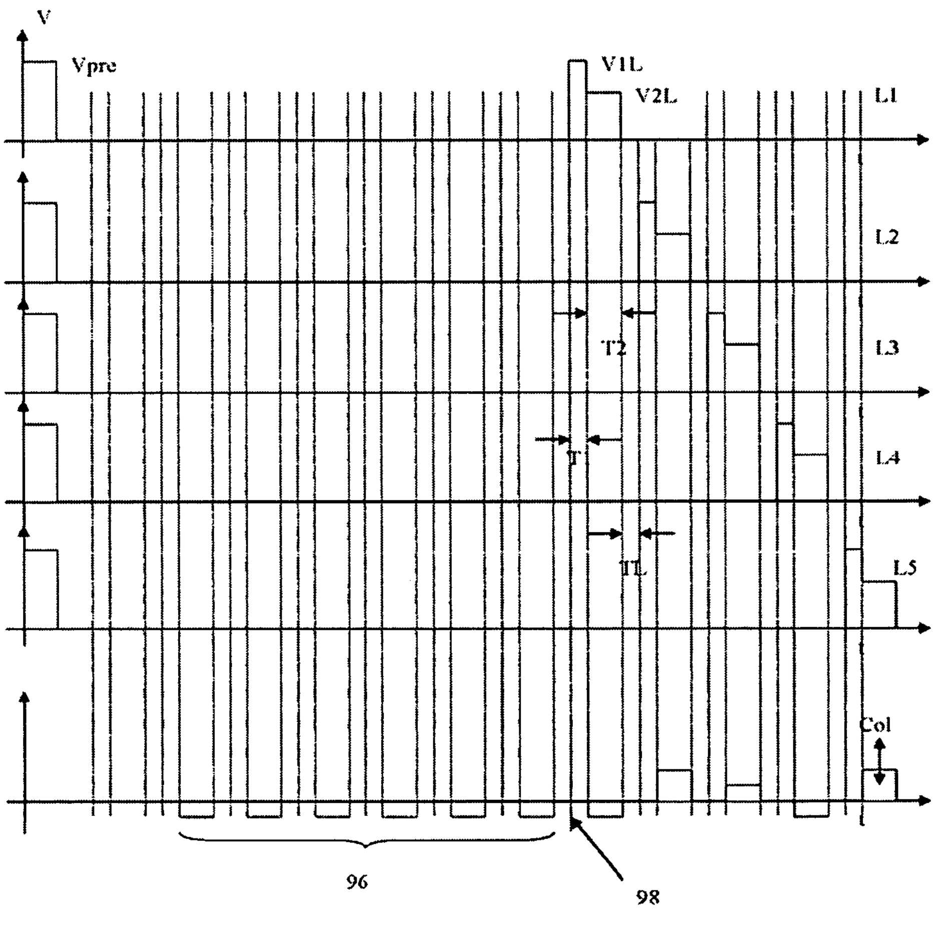
FIG. 19 shows an example of the implementation of the equalization of the voltage Vrmsac according to the invention by the addition of virtual lines and column pre-pulses before the first line of the sweeping.

In a first embodiment, shown in FIG. 19, the column pre-pulses have a time distribution such that they correspond to virtual lines before the first line of the image, with a period equal to $T_{ligne}$. Values identical to those of the first line, or any other value which would be suitable for the required image quality, could be used as voltage and time values for the column signals applied during these virtual lines.

In a second embodiment, the virtual lines could be replaced by a single column pre-pulse, of a suitable duration and voltage for the required voltage value.

For example, to obtain a voltage of 1 volt on the first line, between 10 and 50 column pulses could be sent before the addressing of said first line with voltage equal to 2 volts, duration 100 μs, and spaced out by 300 μs. On the lower diagram in FIG. 19, 6 column pre-pulses 96 have been shown before the beginning of the display. Reference 98 corresponds to the beginning of the display.

The same RMS voltage effect could also be obtained by applying a DC voltage of 1 Volt to the columns for several milliseconds.

Figure 20:
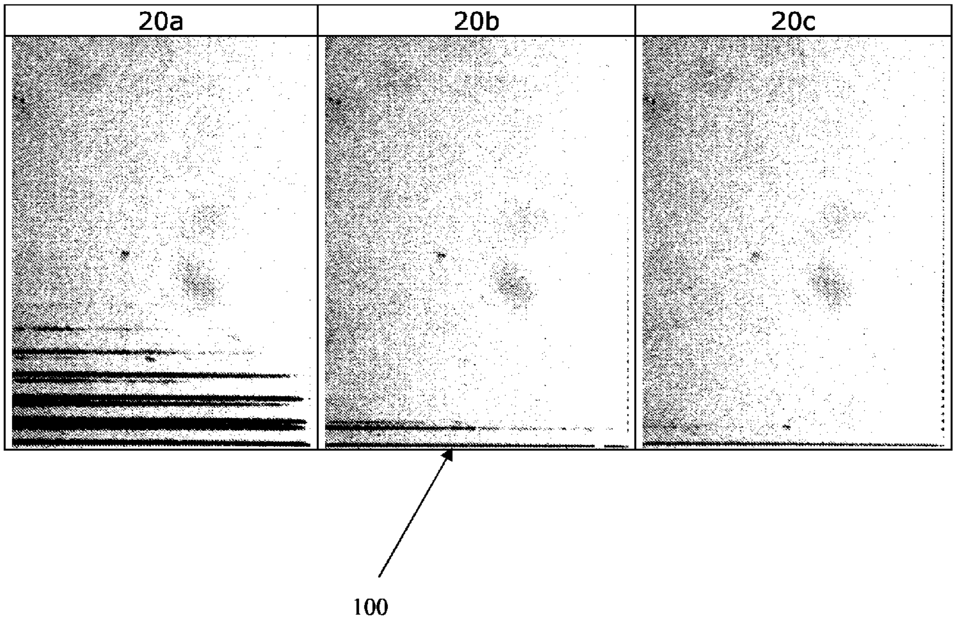
FIG. 20 shows an example of the result of the implementation of the equalization of the voltage Vrmsac according to the invention.

FIG. 20 shows the result on the beginning of the display for a display of 160 lines by 160 columns as previously described.

The signals used are the same as those in FIG. 18. Reference 100 corresponds to the beginning of the lines display.

In FIG. 20*a*, the first lines of the display receive no equalization signal. It can be noted that these do not show a texture 100% T as expected but comprise a non-null proportion of parasite texture U (dark).

In FIG. 20*b*, the first lines of the display receive an equalization signal of 10 column pre-pulses. A reduction in the proportion of parasite texture U can be noted.

In FIG. 20*c*, the first lines of the display receive an equalization signal of 20 column pre-pulses. The proportion of parasite texture U has become virtually null.

It can be noted therefore that the addition of 10 to 20 RMS equalization pre-pulses before the beginning of the display makes it effectively possible to prevent disturbance observed on the first lines of the display.

The addition of RMS equalization pre-pulses before the beginning of the display could also be carried out via the line electrodes. For example, the first lines of the display would be able to receive in a selective manner the RMS equalization signals before starting the image sweeping.

VARIANT 5

Case of a Partial Image Refresh

The RMS equalization principle before the start of sweeping can be extended to the case of a partial image refresh.

In the case where only a section of the image requires modification, for example a group of P×K pixels located at the intersection of the lines N to N+P and the columns M to M+K, it could be decided to subject the P×K pixels concerned to RMS equalization voltages as described above. As in the above case, these RMS equalization signals could be applied either via column electrodes, or by using both line and column electrodes.

This method is compatible with the various different options described above: insertion of equalization every line, every p lines, or every virtual line.

VARIANT 6

Use of the Regulation of the RMS Voltage to Compensate the Non-uniformities of the Operating Points Due to Other Characteristics of the Display The local value of the left and right operating points of a display of BiNem type can differ from one pixel to another in the case, for example of a non-uniformity of the anchoring layers due to a bad control of depositing or brushing parameters. It can also be affected by variations in cell gap (due to particles, for example).

It would be appropriate therefore to use the RMS voltage regulation signals to compensate for these non-uniformities inherent to a given display.

Figure 21:
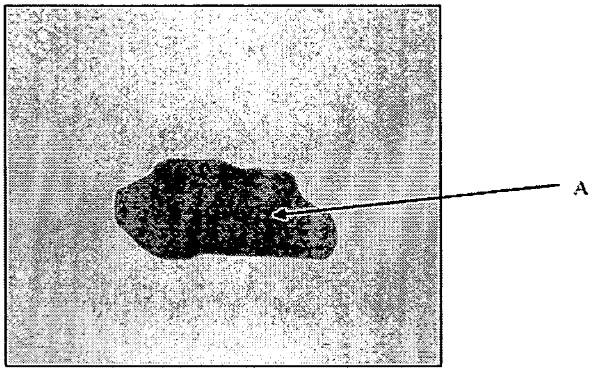
FIG. 21 shows an example of non uniformity of a gray level independent from the equalization of Vrmsac.

In the example in FIG. 21, a display of the type shown in FIG. 18 according to variant 1 is considered, on which it is required to display a uniform gray level "g" by using the compensation of RMS voltage as described in variant 1 (Vrmsac*=2.04).

It is observed that the display nevertheless has a zone (called zone A) that is darker, corresponding to pixels having a quantity of texture T that falls below requirements.

Figure 22:
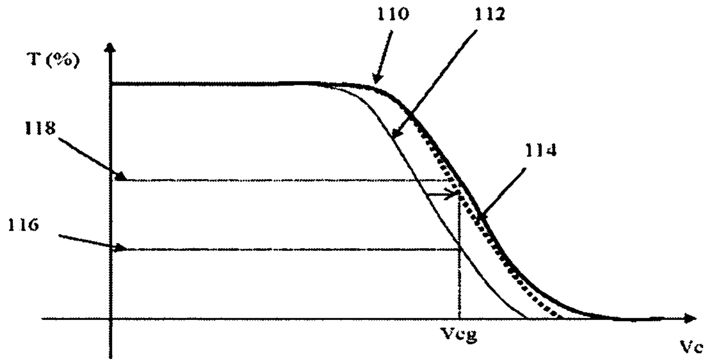
FIG. 22 shows the effect of the increase of the voltage Vrmsac in zone

This zone presents therefore a T→U switchover threshold with voltage Vrmsac*=2.04 V lower than that of the rest of the screen, as shown in FIG. 22. This non-uniformity can be due to a bad control of the display's manufacturing parameters.

A solution to rectify this non uniformity could then consist in a modification of the RMS voltage $Vrmsac_A$* seen by the pixels of zone A (in the case of this example, $Vrmsac_A$*>Vrmsac* would be required), by using the RMS voltage regulation according to the invention, in such a way as to make the switchover threshold evolve for the pixels of zone A towards voltage values and column time values compatible with those of the rest of the display (cf FIG. 22).

In the diagram in FIG. 22, the column voltage Vc is in abscissa, and the percentage of texture T has been entered in ordinates. Curve 110 is the electrooptical response curve for the display at RMS voltage equalized at Vrmsac*=2.04, curve 112 is the electrooptical response curve for zone A at RMS voltage equalized at Vrmsac*=2.04 Volt and curve 114 is the electrooptical response curve for zone A at RMS voltage equalized at VrmsacA*=2.1 Volt. In ordinates, reference 116 has been used to indicate the gray level in zone A and reference 118 has been used to indicate the required gray level "g".

The RMS voltage seen by a pixel on the display depends on the column signals which have been used to address the pixels of the previous lines located on the same column. Typically, it is necessary to take into account between about ten and about twenty previous lines to evaluate the RMS voltage seen by a pixel at the time of its switchover.

The regulation of the RMS voltage $Vrmsac_A$* in a given zone A of the display such as $Vrmsac_A$*≠Vrmsac* (Vrmsac* being the equalized RMS voltage according to the invention for the rest of the display's pixels), by using the means of the invention, could be carried out in the continuity of the display, by using a progressive variation of the RMS voltage from Vrmsac* towards $Vrmsac_A$*.

Preferably, however, this will be carried out by introducing virtual lines. A precise control of switchover thresholds throughout the full display is thus permitted, entailing a slight extension of the image refresh time.

CITED DOCUMENTS

Doc [1]: FR 2740 894
Doc [2]: C. Joubert, proceeding SID 2002, p. 30-33, "Ultra low power bright reflective displays using binem technology fabricated by standard manufacturing equipment".
Doc [3]: Patent application FR 02 01448
Doc [4]: Patent application FR 02 04940
Doc [5]: FR 2824400
Doc [6]: M. Giocondo, I. Lelidis, I. Dozov, G. Durand, Eur. Phys. J. AP 5, 227 (1999).
Doc [7]: I. Dozov, Ph. Martinot-Lagarde, Phys. Rev. E., 58, 7442 (1998).
Doc [8]: FR0106045
Doc [9]: FR0305934
Doc [10]: C. Joubert et al, proceeding IDWO4, p 1711, "A new approach to gray scale in biNem LCDs".
Doc [11]: Liquid Crystal Displays, addressing schemes and electrooptical effects, Ernst Lueder, John Wiley and Sons, Ed 2001, chapter 12 (p 167)

The invention claimed is:

1. An addressing method for a bistable nematic liquid crystal matrix screen, the bistable nematic liquid crystal presenting two stable textures without any electric field applied, the matrix screen having pixel lines and pixel columns, the screen further having two substrates between which the liquid crystal is placed, the first substrate including line addressing electrodes and the second substrate including column addressing electrodes, the addressing of the pixels being of passive multiplexed type, the lines being addressed one by one while all the columns are simultaneously addressed during an excitation time of each line said method comprising:

a switchover of each pixel from one state to another being commanded by an electric switchover voltage applied between the substrates at the level of the corresponding pixel at the time of its switchover; and when displaying an image, an electric voltage (V(t)) applied between the substrates is chosen for each pixel such that an average quadratic time value of the voltage, from a beginning of the image display command (t) until a moment (t+δt) immediately preceding the switchover of said pixel, presents a predetermined value (Vrmsac):

which is independent of an image information to be displayed on a given pixel of the screen, and which is the same for all the pixels of the screen displaying the image, wherein the predetermined value (Vrmsac) is calculated by the following equation $$Vrmsac = \sqrt{\frac{\int_t^{t+\delta t} V^2(t)\,dt}{\int_t^{t+\delta t} dt}}.$$

2. The method according to claim 1, wherein the average quadratic time value is at least equal to a maximum average electric voltage (Vrmsac(max)) that can be obtained with display of a uniform gray level giving the highest contribution to the average voltage in question.

3. The method according to claim 1 wherein, to obtain the predetermined value of the average voltage, at least one equalization pulse is applied on the column corresponding to the pixel for which switchover is required.

4. The method according to claim 1, further comprising a step of supplying each line with at least one equalization pulse to obtain the predetermined value of the average voltage at each line.

5. The method according to claim 4 wherein, to obtain a required gray level for each pixel, voltage is applied to the column corresponding to the pixel a selection pulse for the required texture which is preceded by at least one equalization pulse, the selection pulse and the at least one equalization pulse having voltages such that the average applied voltage corresponds to the predetermined value of the average voltage.

6. The method according to claim 5, wherein the equalization pulse is applied during the excitation of the line of the pixel to be switched over.

7. The method according to claim 6, wherein the equalization pulse is applied during a beginning of the excitation of the line of the pixel to be switched over.

8. The method according to claim 6, wherein the excitation signal for the line includes two successive parts having different polarities and in which the equalization signal is applied during a first part of the excitation signal.

9. The method according to claim 3, wherein the at least one equalization pulse is applied to the column corresponding to the pixel during excitation of the line of the corresponding pixel.

10. The method according to claim 3 wherein, to obtain said predetermined value for the average voltage, the at least one equalization pulse is applied to the column corresponding to the pixel during excitation of a line preceding the line of the corresponding pixel.

11. The method according to claim 10, wherein the at least one equalization pulse is applied during the excitation of a line on p, wherein p is a predetermined number greater than 1.

12. The method according to claim 1 wherein, to obtain said predetermined value for the average voltage, at least one equalization pulse is applied between the excitation signals of two consecutive lines, the at least one equalization pulse being applied in the absence of line excitation signals.

13. The method according to claim 11, wherein the at least one equalization pulse is applied according to a period corresponding to the period separating a predetermined number p' of lines.

14. The method according to claim 1 wherein, to obtain said predetermined value for the average voltage, at least one equalization pulse is applied to the columns, prior to the excitation signal of the first line.

15. The method according to claim 1, wherein the average value required for the voltage of each pixel, immediately before the switchover of this pixel, is obtained by choosing at least one of an amplitude and a duration of the equalization pulses periodically applied.

16. The method according to claim 1 wherein, prior to display in multiplexed mode of each image, a signal is applied to each of the pixels, giving each of the pixels the same texture.

17. The method according to claim 1, wherein to modify an image part comprising a determined number of pixels, the determined number of pixels is subjected to equalization pulses.

18. The method according to claim 1, wherein a respective twisting of the two stable textures of the liquid crystal differ approximately by plus or minus 180°.

19. The method according to claim 17, wherein the first texture is uniform or slightly twisted.

* * * * *